(12) United States Patent
Wakashiro et al.

(10) Patent No.: US 6,516,254 B1
(45) Date of Patent: Feb. 4, 2003

(54) CONTROL DEVICE FOR HYBRID VEHICLE

(75) Inventors: Teruo Wakashiro, Shioya-gun (JP); Atsushi Matsubara, Utsunomiya (JP); Tomoharu Kamo, Kawachi-gun (JP); Kan Nakaune, Kawachi-gun (JP); Yasuo Nakamoto, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/202,025

(22) Filed: Jul. 25, 2002

(30) Foreign Application Priority Data

Aug. 1, 2001 (JP) .......................................... 2001-233915

(51) Int. Cl.⁷ ................................................ B60T 7/12
(52) U.S. Cl. ......................... 701/22; 701/104; 180/65.4; 123/481
(58) Field of Search .......................... 701/22, 101, 104, 701/112; 123/406.45, 429, 478, 481; 180/65.2, 65.3, 65.4

(56) References Cited

U.S. PATENT DOCUMENTS 6,330,498 B2 * 12/2001 Tamagawa et al. ........... 701/22

6,411,885 B1 * 6/2002 Grizzle et al. .............. 701/104

FOREIGN PATENT DOCUMENTS

JP 2000-97068 4/2000
JP 2000-125405 4/2000

* cited by examiner

*Primary Examiner*—Richard M. Camby
(74) *Attorney, Agent, or Firm*—Arent Fox Kintner Plotkin & Kahn, PLLC

(57) ABSTRACT

A control device for a hybrid vehicle includes an actual intake gas negative pressure detection unit which detects an intake air negative pressure for the engine, an estimated intake gas negative pressure calculation unit which estimates an intake air negative pressure based on a revolution number of the engine and an opening degree of a throttle, and an engine control unit which compares an actual intake gas negative pressure obtained by the actual intake gas negative pressure detection unit with an estimated intake gas negative pressure obtained by the estimated intake gas negative pressure calculation unit. The engine control unit prohibits a fuel supply to the engine until the actual intake gas negative pressure matches the estimated intake gas negative pressure, and carries out the fuel supply to the engine when the actual intake gas negative pressure matches the estimated intake gas negative pressure.

12 Claims, 11 Drawing Sheets

CONTROL DEVICE FOR HYBRID VEHICLE

BACKGROUND OF THE INVENTION

1. Field of the Invention

The present invention relates to a control device for parallel type hybrid vehicles in which the operation of a cylinder can be stopped. More specifically, the present invention relates to a control device for a hybrid vehicle which enables improvement in fuel consumption efficiency while maintaining salability when the vehicle is reaccelerated from a cylinder deactivated operation state.

2. Description of Related Art

Hybrid vehicles provided with a motor as an auxiliary driving source for running the vehicle in addition to an engine have been conventionally known. A parallel hybrid vehicle in which output from an engine is auxiliary assisted by a motor is a variation of the hybrid vehicles.

In the parallel hybrid vehicle, output from the engine is auxiliary assisted by the motor when the vehicle is accelerated, and various controls, such as charging of batteries using deceleration regeneration, are performed when the vehicle is decelerated so that the needs of the driver can be satisfied while maintaining remaining charge (electric energy) of the batteries. Also, the parallel hybrid vehicle, in terms of its structure, has a mechanism in which the engine and the motor are arranged in series. Accordingly, the parallel hybrid vehicle has advantages in that its structure can be simplified to decrease the weight thereof and to improve the degree of freedom in vehicle loading capacity.

The types of the parallel hybrid vehicle includes one in which a clutch is provided between the engine and the motor in order to eliminate the influence of engine friction (engine brake) during deceleration regeneration as disclosed in, for instance, the Japanese Unexamined Patent Application, First Publication No. 2000-97068, and one in which the engine, motor, and transmission are connected in series in order to maximally simplify its structure as disclosed in, for instance, the Japanese Unexamined Patent Application, First Publication No. 2000-125405.

However, the former in which the clutch is provided between the engine and the motor has disadvantages that its structure is complicated due to the presence of the clutch, which in turn deteriorates the loading capacity, and that its mechanical efficiency of power transmission during a running mode is decreased due to the used of the clutch. On the other hand, the latter in which the engine, motor, and transmission are connected in series has a regeneration amount decreased by the above-mentioned engine friction, and hence the amount of electric energy obtained by regeneration is reduced. Accordingly, it has problems in that the driving auxiliary (i.e., the amount of assist) etc. is restricted by the motor.

Also, in the former, a method for reducing engine friction during deceleration is available in which the amount of regeneration is increased by controlling a throttle valve to an open side during deceleration using an electronic control throttle mechanism in order to significantly decrease a pumping loss. However, there is a problem that a large amount of new gas directly flows into an exhaust system during deceleration to lower the temperature of catalyst or an A/F sensor, and exhaust gas control is adversely influenced.

With regard to the above, proposals have been made to solve the problem by using a cylinder deactivation technique. However, there is a problem in that smooth transition from a cylinder deactivated state to an all cylinder operation state is difficult.

SUMMARY OF THE INVENTION

Accordingly, an object of the present invention is to provide a control device for a hybrid vehicle which enables a smooth transition from the cylinder deactivated state to the all cylinder operation state using a cylinder deactivation technique so as to improve fuel consumption efficiency.

In order to achieve the above object, the present invention provides a control device for a hybrid vehicle provided with an engine (for instance, an engine E in an embodiment described later) including a plurality of cylinders and a motor (for instance, a motor M in the embodiment described later) as driving sources, in the vehicle a supply of fuel to the engine during a deceleration state of the vehicle is stopped and a regeneration control is performed by the motor in accordance with the state of deceleration, and the engine is a cylinder deactivatable engine capable of switching to an all cylinder operation state from a cylinder deactivated operation state in which at least one of the cylinders is deactivated, and vice versa, so that a cylinder deactivated operation of the engine is carried out in accordance with an operation state of the vehicle during deceleration, the control device comprising: an actual intake gas negative pressure detection unit (for instance, an inlet pipe negative pressure sensor SI in the embodiment described later) which detects an intake air negative pressure for the engine; an estimated intake gas negative pressure calculation unit (for instance, a step S201 shown in FIG. 5 in the embodiment described later) which estimates an intake air negative pressure based on a revolution number of the engine and an opening degree of a throttle, both the actual intake gas negative pressure detection unit and the estimated intake gas negative pressure calculation unit being used when the operation state of the engine is switched to the all cylinder operation state from the cylinder deactivated operation state, and a supply of fuel to the engine is about to be restarted by a fuel supply amount control unit (for instance, an FIECU 11 in the embodiment described later); and an engine control unit (for instance, also the FIECU 11 in the embodiment described later) which compares an actual intake gas negative pressure obtained by the actual intake gas negative pressure detection unit with an estimated intake gas negative pressure obtained by the estimated intake gas negative pressure calculation unit, the engine control unit prohibits a fuel supply to the engine until the actual intake gas negative pressure matches the estimated intake gas negative pressure, and carries out the fuel supply to the engine when the actual intake gas negative pressure matches the estimated intake gas negative pressure.

According to the above control device for a hybrid vehicle, it becomes possible, when returning to the all cylinder operation state to the cylinder deactivated operation state, to stop the fuel supply until the actual intake gas pressure matches the estimated intake gas negative pressure, and to restart the fuel supply quickly when the actual intake gas pressure matches the estimated intake gas negative pressure. Accordingly, as compared with the case where a fuel supply is restarted when the inlet pipe negative pressure is completely recovered, it becomes possible to shorten the time interval to the fuel supply and improve the salability during reacceleration after returning from the cylinder deactivated operation state.

In accordance with another aspect of the invention, in the control device for a hybrid vehicle, an initial value of fuel injection amount smaller than a normal fuel injection amount is set when the fuel supply is restarted, and an amount of the fuel supply is gradually increased until the fuel injection amount reaches the normal fuel injection amount.

According to the above control device for a hybrid vehicle, it becomes possible to suppress the generation of shock by gradually increasing the amount of fuel supply which is started when the actual intake gas negative pressure matches the estimated intake gas negative pressure. Accordingly, the salability during reacceleration can be improved.

In accordance with yet another aspect of the invention, in the control device for a hybrid vehicle, a predetermined amount of ignition retard is carried out when returned to the all cylinder operation state from the cylinder deactivated operation state, and an ignition timing is gradually returned to a normal ignition timing after restarting a fuel injection.

According to the above control device for a hybrid vehicle, it becomes possible to carry out an ignition retard of a predetermined amount immediately after returning to the all cylinder operation state from the cylinder deactivated operation state, and the delay of the ignition timing can be gradually returned to normal ignition timing. Accordingly, shock generated when returned to the all cylinder operation state can be decreased, and a smooth transition of the operation states can be performed.

In accordance with another aspect of the invention, in the control device for a hybrid vehicle, a driving force is assisted by the motor during a time period between fuel supply prohibition and a restart of fuel supply when returning to the all cylinder operation state from the cylinder deactivated operation state.

According to the above control device for a hybrid vehicle, it becomes possible to carry out acceleration using the motor during the time period between the fuel supply prohibition and a restart of the fuel supply when returning to the all cylinder operation state form the cylinder deactivated operation state. Accordingly, it becomes possible to maintain the acceleration performance during a time period in which no fuel is supplied, and hence, the salability can be improved.

The present invention also provides a control device for a hybrid vehicle provided with an engine including a plurality of cylinders and a motor as driving sources, in the vehicle a supply of fuel to the engine during a deceleration state of the vehicle is stopped and a regeneration control is performed by the motor in accordance with the state of deceleration, and the engine is a cylinder deactivatable engine capable of switching to an all cylinder operation state from a cylinder deactivated operation state in which at least one of the cylinders is deactivated, and vice versa, so that a cylinder deactivated operation of the engine is carried out in accordance with an operation state of the vehicle during deceleration, the control device comprising: an actual intake gas negative pressure detection unit which detects an intake air negative pressure for the engine; an estimated intake gas negative pressure calculation unit which estimates an intake air negative pressure based on a revolution number of the engine and an opening degree of a throttle, both the actual intake gas negative pressure detection unit and the estimated intake gas negative pressure calculation unit being used when the operation state of the engine is switched to the all cylinder operation state from the cylinder deactivated operation state, and a supply of fuel to the engine is about to be restarted by a fuel supply amount control unit; and an engine control unit which compares an actual intake gas negative pressure obtained by the actual intake gas negative pressure detection unit with an estimated intake gas negative pressure obtained by the estimated intake gas negative pressure calculation unit, the engine control unit determines a fuel supply amount based on the actual intake gas negative pressure when the actual intake gas negative pressure is larger than the estimated intake gas negative pressure, and determines the fuel supply amount based on the estimated intake gas negative pressure when the estimated intake gas negative pressure is larger than the actual intake gas negative pressure, and carries out the fuel supply.

According to the above control device for a hybrid vehicle, it becomes possible to supply a fuel, when returning to the all cylinder operation state from the cylinder deactivated state, based on one of the actual intake gas negative pressure and the estimated intake gas negative pressure, whichever is the greater, so that acceleration performance can be secured and the salability can be improved.

In accordance with another aspect of the invention, in the control device for a hybrid vehicle, a fuel injection amount based on the actual intake gas negative pressure is determined after returning to the all cylinder operation state from the cylinder deactivated operation state and a predetermined period of time has elapsed.

According to the above control device for a hybrid vehicle, a fuel injection amount based on the actual intake gas negative pressure is determined after a predetermined time period has elapsed even if a problem is caused, and hence reliability can be improved.

In accordance with another aspect of the invention, the control device for a hybrid vehicle further includes an ignition timing control unit (for instance, the FIECU in the embodiment described later) which controls an ignition timing, and the ignition timing control unit carries out an ignition timing control based on the actual intake gas negative pressure and the estimated intake gas negative pressure.

According to the above control device for a hybrid vehicle, it becomes possible to set a proper ignition timing corresponding to the fuel supply, and hence, acceleration performance when returned to the all cylinder operation state from the cylinder deactivated operation state can be secured.

The present invention also provides a control device for a hybrid vehicle provided with an engine including a plurality of cylinders and a motor as driving sources, in the vehicle a supply of fuel to the engine during a deceleration state of the vehicle is stopped and a regeneration control is performed by the motor in accordance with the state of deceleration, and the engine is a cylinder deactivatable engine capable of switching to an all cylinder operation state from a cylinder deactivated operation state in which at least one of the cylinders is deactivated, and vice versa, so that a cylinder deactivated operation of the engine is carried out in accordance with an operation state of the vehicle during deceleration, the control device comprising: a basic fuel injection amount calculation unit (for instance, the FIECU 11 in the embodiment described later) which calculates a basic fuel injection amount (for instance, a basic fuel injection amount TiM in the embodiment described later) based on an intake air negative pressure for the engine and a revolution number of the engine; and a fuel injection amount calculation unit (for instance, a step S401 shown in FIG. 12 in the FIECU 11 in the embodiment described later) which calculates a fuel injection amount (for instance, a fuel injection amount Ti in the embodiment described later) based on the revolution number of the engine and an opening degree of a throttle, both the basic fuel injection amount calculation unit and the fuel injection amount calculation unit being used when the operation state of the engine is switched to the all cylinder operation state from the cylinder deactivated operation state, and a supply of fuel to the engine is about to be restarted by a fuel supply amount control unit; and an engine control unit which compares a fuel injection amount calculated by the fuel injection amount calculation unit with a basic fuel injection amount calculated by the basic fuel injection amount calculation unit, and carries out a fuel supply based on a comparison result obtained.

According to the above control device for a hybrid vehicle, it becomes possible to compare the fuel injection amount with the basic fuel injection amount and a lower injection amount can be selected and set. Accordingly, acceleration performance can be secured while minimizing deterioration in the fuel consumption efficiency when returned to the all cylinder operation state from the cylinder deactivated operation state.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of a particular preferred embodiment, set out below to enable one to build and use one particular implementation of the invention, is not intended to limit the enumerated claims, but to serve as a particular example thereof.

Figure 1:
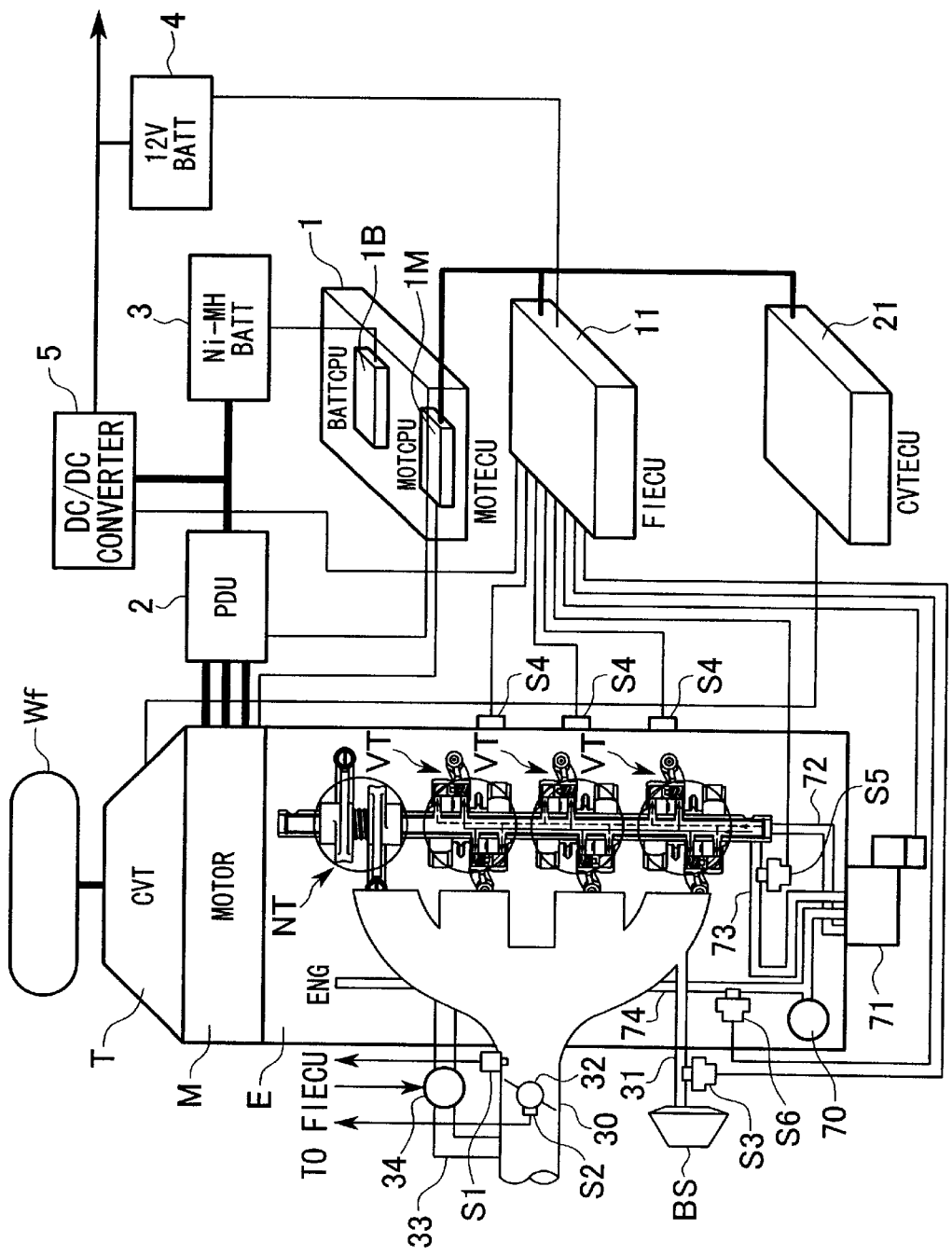
FIG. 1 is a schematic structural diagram showing a hybrid vehicle according to an embodiment of the present invention.

FIG. 1 is a diagram showing a parallel hybrid vehicle according to the first embodiment of the present invention. The parallel hybrid vehicle shown in FIG. 1 has a structure in which an engine E, a motor M, and a transmission T, are connected in series. The driving force from both the engine E and the motor M are transmitted to a front wheel Wf, which is a driving wheel, via the transmission T (which can be a manual transmission), such as a CVT. Also, when the driving force is transmitted to the motor M side from the front wheel Wf during deceleration of the hybrid vehicle, the motor M functions as a power generator to exert a regenerative braking force so as to collect the kinetic energy of the vehicle as an electric energy. In this embodiment, the regeneration control by the motor M is carried out by taking into account an increased amount of deceleration energy by a cylinder deactivated operation which will be described later.

The actuation and regeneration operation of the motor M are carried out by a power drive unit (PDU) 2 which receives a control command from a motor CPU 1M of a motor ECU1. A high voltage type nickel-hydrogen battery 3, which supplies and receives an electric energy from the motor M, is connected to the power drive unit 2. The battery 3 is formed by, for instance, a plurality of modules, in each of which a plurality of cells are connected in series as one unit, connected in series. A 12-volt auxiliary battery 4 for driving various auxiliary machineries is mounted on the hybrid vehicle, and the auxiliary battery 4 is connected to the battery 3 via a downverter 5 which is a DC-DC converter. The downverter 5, which is controlled by a FIECU 11 (fuel supply amount control means, engine control means, and ignition timing control means), charges the auxiliary battery 4 by decreasing the voltage of the battery 3. Also, the motor ECU 1 is provided with a battery CPU 1B which protects, and calculates the remaining charge of, the battery 3. Moreover, the transmission T, which may be the abovementioned CVT, is connected to a CVTECU 21 which controls the transmission T.

The FIECU 11, in addition to the motor ECU 1 and the downverter 5, controls operation of a fuel injection valve (not shown in the figure), which adjust the amount of fuel supplied to the engine E, of a starter motor, and of ignition timing. For this reason signals are input to the FIECU 11 from a speed sensor which detects the vehicle's speed, an engine revolution number sensor which detects the revolution number of the engine, a shift position sensor which detects a shift position of the transmission T, a brake switch which detects operation of a brake pedal, a clutch switch which detects operation of a clutch pedal, throttle sensor which detects an opening degree of a throttle valve 32, an inlet pipe negative pressure sensor (actual depression at engine manifold detection means) which detects inlet pipe negative pressure (actual depression at engine manifold), and a knock sensor.

The letters BS shown in FIG. 1 indicate a booster which is coupled to the brake pedal, and a sensor for detecting negative pressure in a brake master power (hereinafter called negative pressure in master power) is provided with the booster BS. Also, the sensor for detecting negative pressure in master power is connected to the FIECU 11.

In FIG. 1, for the sake of explanation, among the above sensors, an inlet pipe negative pressure sensor (an inlet air pressure detection means) S1, and a throttle sensor S2, which are disposed at an inlet passage 30, a sensor for detecting negative pressure inside master power at a communication passage 31, which is connected to the inlet passage 30, and knock sensors S4 are shown.

The inlet passage 30 is provided with a secondary air passage 33 which connects an upstream side and a downstream side of the throttle valve 32, and the secondary air passage 33 is provided with a control valve 34 which opens and closes the secondary air passage 33. The secondary air passage 33 is used to supply a small amount of air into a cylinder even when the throttle valve 32 is completely closed. The control valve 34 is opened and closed based on a signal from the FIECU 11 in accordance with the inlet pipe negative pressure which is detected by the inlet pipe negative pressure sensor S1. Also, a POIL sensor S5, a solenoid of a spool valve 71, and a TOIL sensor S6, which are described later, are also connected to the FIECU 11. The knock sensors S4 are used to detect a misfire state of a cylinder provided with a variable valve timing mechanism VT.

The engine E is provided with three cylinders including a variable valve timing mechanism for cylinder deactivated operation at an inlet side and an exhaust side, and with one cylinder including an ordinary valve train NT which does not carry out a cylinder deactivated operation.

That is, the above-mentioned engine E is a cylinder deactivatable engine which may be switched from an all cylinder operation state in which the four cylinders including the three stoppable cylinders are operated, to a cylinder deactivated operation state in which the operation of three stoppable cylinders are stopped. Hence, the engine E has a structure in which an inlet valve IV and an exhaust valve EV of the stoppable cylinders can stop the operation by the variable valve timing mechanism VT.

Next, the variable valve timing mechanism VT will be described in detail with reference to FIGS. 9–11.

Figure 9:
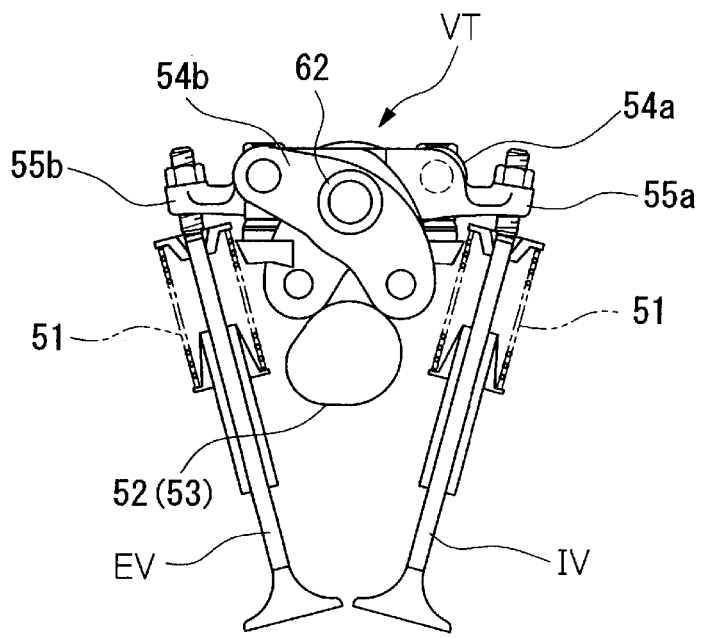
FIG. 9 is a diagram showing a front elevational view of a variable valve timing mechanism used in an embodiment according to the present invention.

FIG. 9 is a diagram showing an example in which the variable valve timing mechanism VT for cylinder deactivated operation is applied to a SOHC type engine. The inlet valve IV and the exhaust valve EV are provided with a cylinder (not shown in the figure), and the inlet valve IV and the exhaust valve EV are urged towards a direction closing an inlet and exhaust port (not shown in the figure) by valve springs 51 and 51. On the other hand, the numeral 52 in FIG. 9 indicates a lift cam provided with a cam shaft 53, and a rocker arm 54a for cam lift at the inlet valve side and a rocker arm 54b for cam lift at the exhaust valve side, which are rotatably supported via a rocker arm shaft 62, are coupled to the lift cam 52.

Also, rocker arms 55a and 55b for driving valves are rotatably supported by the rocker arm shaft 62 adjacent to the rocker arms 54a and 54b for cam lift. A rotation end of rocker arms 55a and 55b, respectively, pushes an upper end of the inlet valve IV and the exhaust valve EV to perform an opening valve operation for the inlet valve IV and the exhaust valve EV. Moreover, as shown in FIGS. 10A and 10B, a base end side (i.e., opposite the valve contacting portion side) of the rocker arms 55a and 55b are made so as to slidably make contact with a round cam 531 provided with the cam shaft 53.

Figure 10A:
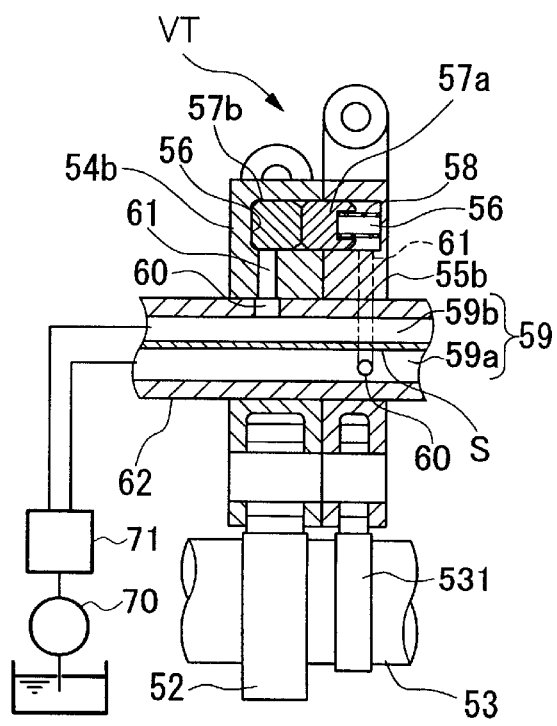
FIG. 10A is a diagram showing a cross-sectional view of main parts of the variable valve timing mechanism, which is used in an embodiment according to the present invention, in a cylinder operation state.
Figure 10B:
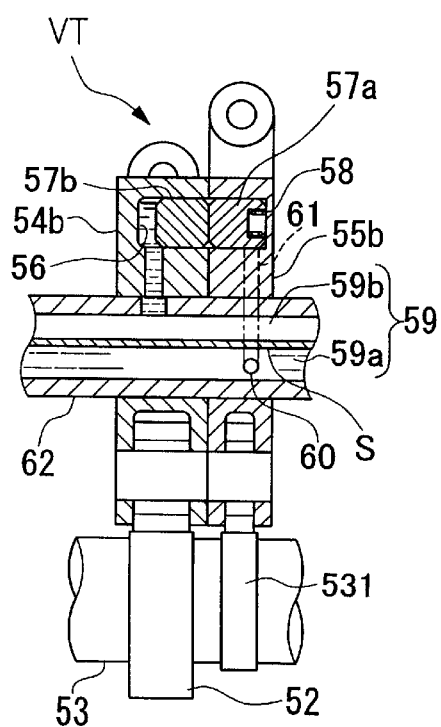
FIG. 10B is a diagram showing a cross-sectional view of main parts of the variable valve timing mechanism in a cylinder deactivated operation state.

FIGS. 10A and 10B are diagrams showing the rocker arm 54b for the cam lift and the rocker arm 55b for driving the valve viewed from the exhaust valve side.

In FIGS. 10A and 10B, a hydraulic chamber 56 for the rocker arm 54b for the cam lift and the rocker arm 55b for driving the valve is disposed at the opposite side of the lift cam 52. A pin 57a and a release pin 57b are sidably provided inside the hydraulic chamber 56, and the pin 57a is urged towards the rocker arm 54b side via a pin spring 58.

A hydraulic passage 59 (59a and 59b), which is separated by a partition portion S, are formed inside the rocker arm shaft 62. The hydraulic passage 59b communicates with the release pin 57b side of the hydraulic chamber 56 via an opening portion 60 of the hydraulic passage 59b, and a communication passage 61 of the rocker arm 54b for the cam lift, and the hydraulic passage 59a communicates with the pin 57a side of the hydraulic chamber 56 via an opening portion 60 of the hydraulic passage 59a, and a communication passage 61 of the rocker arm 55b for driving the valve so that it can be connected to a drain passage which is not shown in the figure.

When no oil pressure is exerted from the hydraulic passage 59b, the pin 57a is located at a position extending over both the rocker arm 54b and the rocker arm 55b by the pin spring 58 as shown in FIG. 10a. On the other hand, when oil pressure is exerted from the hydraulic passage 59b based on a cylinder deactivation signal, the pin 57a slides towards the rocker arm 55b together with the release pin 57b against the pin spring 58 as shown in FIG. 10B, and the pin 57a release the engagement of the rocker arm 54b with the rocker arm 55b when the boundary portion with the release pin 57b matches the boundary portion between the rocker arm 54b and the rocker arm 55b. Note that the inlet valve side thereof has the same structure. In this embodiment, the hydraulic passages 59a and 59b are connected to an oil pump 70 via a spool valve 71 which secures the oil pressure for the variable valve timing mechanism VT.

Figure 11:
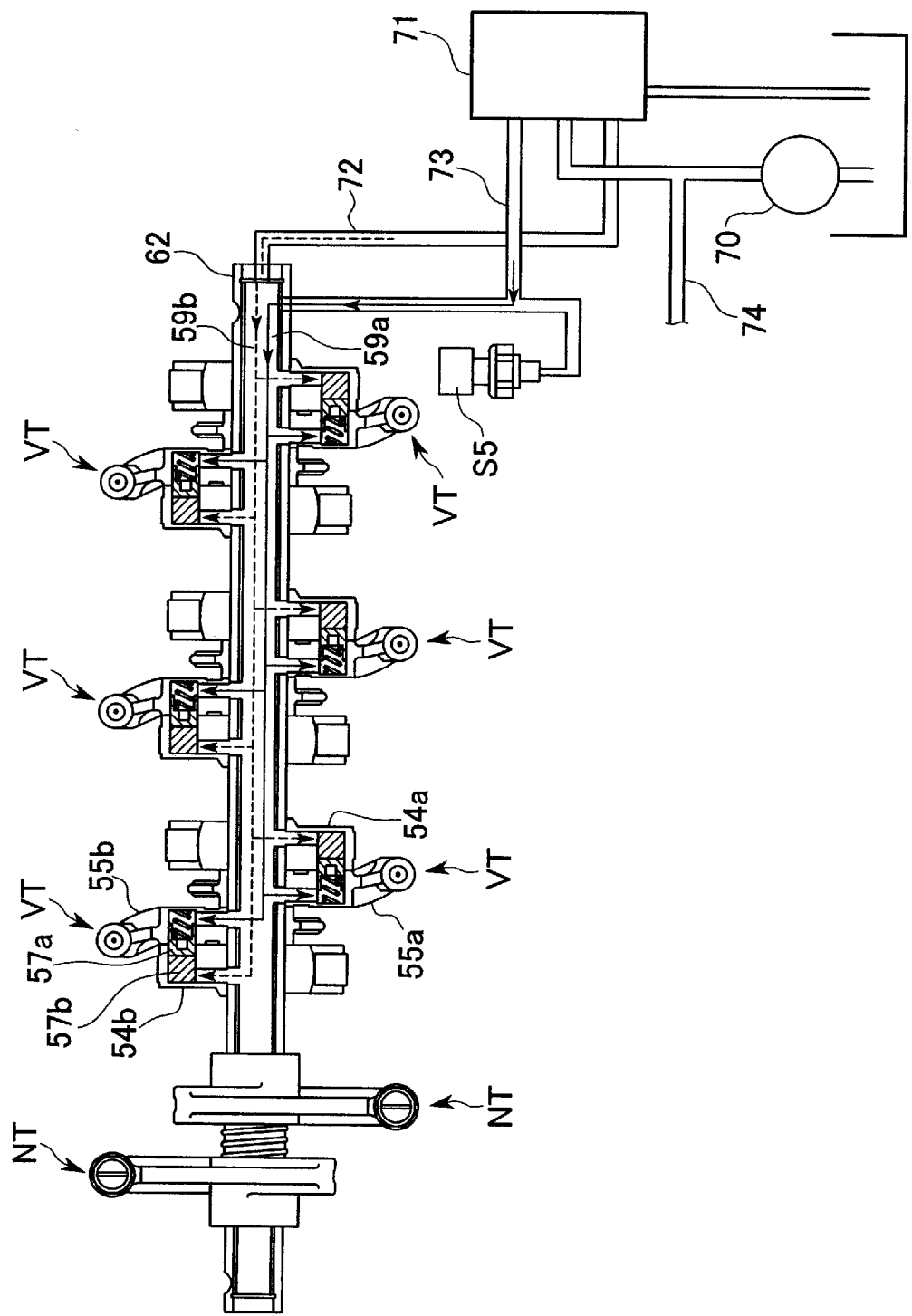
FIG. 11 is a diagram showing an enlarged view of main parts shown in FIG. 1.

As shown in FIG. 11, a cylinder deactivation side passage 72 of the spool valve 71 is connected to the hydraulic passage 59b of the rocker arm shaft 62, and a cylinder deactivation cancel side passage 73 of the spool valve 71 is connected to the hydraulic passage 59a. Here, the POIL sensor S5 is connected to the cylinder deactivation cancel side passage 73. The POIL sensor S5 monitors the oil pressure of the cylinder deactivation cancel side passage 73 in which the pressure level becomes low during the cylinder deactivated state, and the pressure level becomes high during the all cylinder operation state. Also, the TOIL sensor S6 (shown in FIG. 1), which detects the temperature of oil, is connected to a supply passage 74, which is a discharge side passage of the oil pump 70 and is branched from a passage to the spool valve 71 to supply hydraulic oil to the engine E, in order to monitor the temperature of the hydraulic oil supplied.

Accordingly, when conditions for the cylinder deactivated operation, which will be described later, are satisfied, the spool valve 71 is operated based on a signal from the FIECU 11, and oil pressure is applied to the hydraulic chamber 56 from the hydraulic passage 59b at both the inlet valve side and the exhaust valve side via the oil pump 70. Then, the pins 57a and 57a and the release pins 57b and 57b, which have engaged the rocker arms 54a and 54b for cam lift with the rocker arms 55a and 55b for driving the valve, are slid towards the rocker arms 54a and 54b side so that the rocker arms 54a and 54b are disengaged from the rocker arms 55a and 55b.

Therefore, although the rocker arms 54a and 54b are driven by the rotary movement of the lift cam 52, the movement is not transmitted to the rocker arms 55a and 55b whose engagement with the rocker arms 54a and 54b by means of the pins 57a and the release pins 57b is released. As a result, since the rocker arms 55a and 55b at the inlet valve side and the exhaust valve side are not operated, each of the valves IV and EV is kept closed to enable a cylinder deactivated operation.

(Cylinder deactivated operation switching process)

Figure 2:
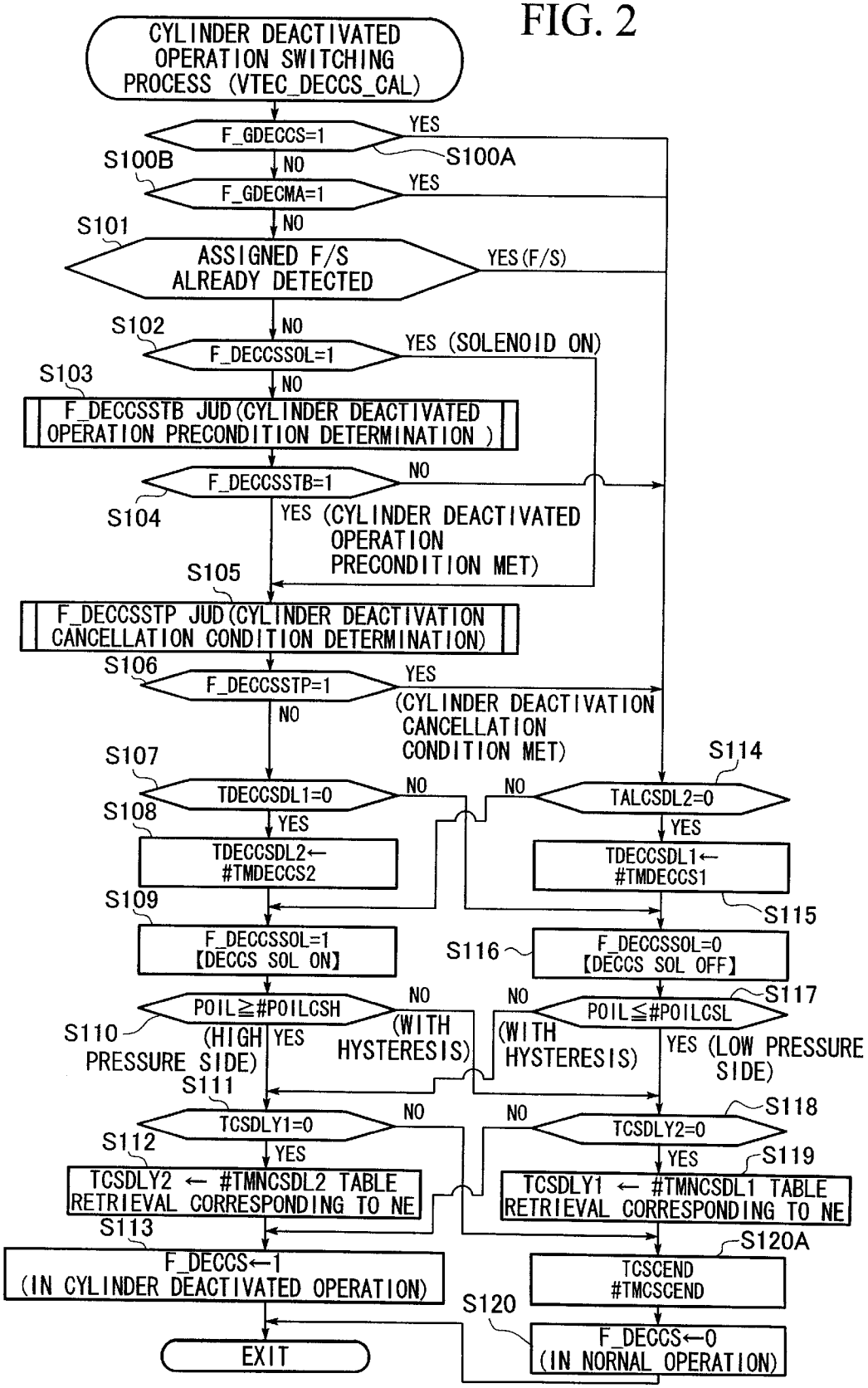
FIG. 2 is a flowchart showing a cylinder deactivated operation switching process in an embodiment according to the present invention.

Next, a cylinder deactivated operation switching process will be explained with reference to FIG. 2.

In this embodiment, the term "cylinder deactivated operation" means an operation in which the inlet valve and the exhaust valve are closed using the variable valve timing mechanism VT during deceleration regeneration under certain conditions, and the cylinder deactivated operation is carried out to decrease engine friction and increase a deceleration regeneration amount. In the flowchart shown in FIG. 2, setting and resetting of a flag (i.e., a cylinder deactivation performing flag F_DECCS) for switching the cylinder deactivated operation and the all cylinder operation, in which no cylinder deactivated operation is carried out, take place in a certain period.

In step S100A, it is determined whether a deceleration G excessive state cylinder deactivation cancel command flag F_GDECCS is "1" or not. If it is determined that the result is "YES" in step S100A, the process proceeds to step S114, and if it is determined that the result is "NO", the process proceeds to step S100B.

In step S100B, it is determined whether a deceleration G excessive state deceleration regeneration cancel command flag F_GDECMA is "1" or not. If it is determined that the result is "YES", the process proceeds to step S114, and if it is determined that the result is "NO", the process proceeds to step S101.

The reason why the determination in step S100A is carried out is because it is preferable not to carry out a cylinder deactivated operation when stopping the vehicle is most preference. Also, since the probability is high that the negative pressure in master power is significantly decreased by a rapid deceleration G braking and the state returns to the all cylinder operation state thereafter during the cylinder deactivated operation, the cylinder deactivated operation can be cancelled when such braking of high deceleration G has taken place.

The reason why the determination in step S100B is carried out is because it is preferable not to carry out a cylinder deactivated operation from the view point of preventing slip of wheels by regeneration during a rapid deceleration state.

In step S101, it is determined if assigned F/S (fail safe) is already detected or not. If the detection result is "NO", the process proceeds to step S102, and if the detection result is "YES", the process proceeds to step S114. This is because the cylinder deactivated operation should not be carried out if there is any abnormality.

In step S102, it is determined whether a cylinder deactivation solenoid flag F_DECCSSOL is "1" (i.e., the cylinder deactivation solenoid of the spool valve 71 is ON) or not. If the determination result is "YES", the process proceeds to step S105, and if the determination result is "NO", the process proceeds to step S103. In step S103, a cylinder deactivated operation precondition determination (F_DECCSSTB_JUD), which will be described later, is carried out and proceeds to step S104. The cylinder deactivated operation is performed only when the preconditions are met in the cylinder deactivated operation precondition determination.

In step S104, it is determined whether a cylinder deactivation standby flag F_DECCSSTB is "1" or not. The value of this flag becomes "1" when the preconditions are met in the determination made in step S103, and the value of the flag becomes "0" when the preconditions are not met. It is determined if the cylinder deactivated operation is carried out or not based on the flag in accordance with the driving state of the vehicle. If the determination result in step S104 is "YES", the process proceeds to step S105 since the preconditions are met. If the determination result in step S104 is "NO", the process proceeds to step S114 since the preconditions are not met.

In step S105, a cylinder deactivation cancellation condition determination (F_DECCSSTP_JUD), which will be described later, is carried out, and the process proceeds to step S106. If the cancellation conditions are met in the cylinder deactivation cancellation condition determination, the cylinder deactivated operation is not performed. The cylinder deactivation cancellation condition determination differs from the cylinder deactivation precondition determination, and is always determined when the process shown in FIG. 2 is carried out (i.e., continuous monitoring).

In step S106, it is determined whether a cylinder deactivation cancellation conditions met flag F_DECCSSTP is "1" or not. The value of this flag becomes "1" when the cancellation conditions are met in the determination made in step S105, and the value of the flag becomes "0" when the cancellation conditions are not met. It is determined if the cylinder deactivated operation is cancelled or not based on the flag in accordance with the driving state of the vehicle. If the determination result in step S106 is "YES", the process proceeds to step S114 since the cancellation conditions are met. If the determination result in step S106 is "NO", the process proceeds to step S107 since the cancellation conditions are not met.

In step S107, it is determined whether a solenoid ON delay timer TDECCSDL1 is "0" or not. If the determination result is "YES", the process proceeds to step S108 since a certain time period has been elapsed. If the determination result in step S107 is "NO", the process proceeds to step S116 since a certain time period has not elapsed.

In step S108, a predetermined value #TMDECCS2 is set for the solenoid OFF delay timer TDECCSDL2 for the above-mentioned spool valve 71, and the process proceeds to step S109. This is to secure a certain time period, when the operation state is switched to the all cylinder operation state from the cylinder deactivated operation state, between the completion of the determination in step S105 and the completion of the OFF operation of the solenoid for the spool valve 71 in step S116, which will be described later.

In step S109, "1" is set for a cylinder deactivation solenoid flag F_DECCSSOL (i.e., the cylinder deactivation solenoid for the spool valve 71 is turned on), and the process proceeds to step S110.

In step S110, it is determined whether the oil pressure is actually generated or not by the ON operation of the above solenoid for the cylinder deactivated operation using the POIL sensor S5. More specifically, it is determined whether the engine oil pressure POIL is equal to or greater than a cylinder deactivated operation determination oil pressure

POILCSH. If the pressure is sufficiently high and the determination result is "YES", the process proceeds to step S111. If the determination result is "NO" (i.e., there is hysteresis), then the process proceeds to step S118. Note that it is possible to make a determination by using an oil pressure switch instead of the POIL sensor S5.

In step S111, it is determined whether a cylinder deactivated operation delay timer TCSDLY1 is "0" or not in order to secure time between the ON operation of the spool valve 71 and the application of oil pressure. If the determination result is "YES", the process proceeds to step S112. If the determination result is "NO", then the process proceeds to step S120A.

In step S112, a timer value #TMNCSDL2 is table retrieved in accordance with the engine revolution number NE, and a cylinder deactivated operation cancellation delay timer TCSDLY2 is set. The reason why the timer value is set in accordance with the engine revolution number NE is because the change responsive time of the oil pressure varies in accordance with the engine revolution number NE. Accordingly, the timer value #TMNCSDL2 becomes larger as the engine revolution number NE becomes smaller.

Then, in step S113, "1" is set for a cylinder deactivated operation flag F_DECCS, and the control is terminated.

In step S114, it is determined whether the solenoid OFF delay timer TDECCSDL2 is "0" or not. If the determination result is "YES", the process proceeds to step S115 since a certain time period has elapsed. If the determination result in step S114 is "NO", then the process proceeds to step S109 since a certain time period has not elapsed.

In step S115, a predetermined value #TMDECCS1 is set for the solenoid ON delay timer TDECCSDL1 for the spool valve 71, and the process proceeds to step S116. This is to secure a certain time period, when the operation state is switched to the cylinder deactivated operation state from the all cylinder operation state, between the completion of the determination in step S105 and the completion of the OFF operation of the solenoid for the spool valve 71 in step S109, which will be described later.

In step S116, "0" is set for a cylinder deactivation solenoid flag F_DECCSSOL (i.e., the cylinder deactivation solenoid for the spool valve 71 is turned off), and the process proceeds to step S117.

In step S117, it is determined whether the oil pressure is actually cancelled or not by the OFF operation of the above solenoid for the cylinder deactivation cancellation operation using the POIL sensor S5. More specifically, it is determined whether the engine oil pressure POIL is less than a cylinder deactivated operation cancellation determination oil pressure #POILCSL. If the pressure is low and the determination result is "YES", the process proceeds to step S118. If the determination result is "NO" (i.e., there is hysteresis), then the process proceeds to step S111. Note that it is possible to make a determination by using an oil pressure switch instead of the POIL sensor S5.

In step S118, it is determined whether a cylinder deactivated operation cancellation delay timer TCSDLY2 is "0" or not in order to secure time between the OFF operation of the spool valve 71 and the release of the oil pressure. If the determination result is "YES", the process proceeds to step S119. If the determination result is "NO", then the process proceeds to step S113.

In step S119, a timer value #TMNCSDL1 is table retrieved in accordance with the engine revolution number NE, and a cylinder deactivated operation delay timer TCSDLY1 is set. Then, the process proceeds to step S120A. The reason why the timer value is set in accordance with the engine revolution number NE is because the change responsive time of the oil pressure varies in accordance with the engine revolution number NE. Accordingly, the timer value #TMNCSDL1 becomes smaller as the engine revolution number NE becomes larger.

In step S120A, a timer value #TMCSCEND is set for a cylinder deactivated operation compulsive cancellation timer TCSCEND, and the process proceeds to step S120. The cylinder deactivated operation compulsive cancellation timer TCSCEND is a timer by which the cylinder deactivated operation is enforceably cancelled when a certain period of time has been elapsed after the cylinder deactivated operation is carried out.

Then, in step S120, "0" is set for a cylinder deactivated operation flag F_DECCS, and the control is terminated.
(Cylinder deactivated operation precondition determination process)

Next, the cylinder deactivated operation precondition determination process in step S103 shown in FIG. 2 will be explained with reference to FIG. 3. Note that this process is repeated periodically.

In step S131, it is determined whether outside air temperature TA is within a predetermined range (i.e., a cylinder deactivated operation lower limit outside air temperature #TADECCS≦TA≦cylinder deactivated operation upper limit outside air temperature #TADECCSH). If it is determined in step S131 that the outside air temperature TA is within the predetermined range, the process proceeds to step S132. If it is determined that the outside air temperature TA is not within the predetermined range, the process proceeds to step S144. This is because the engine becomes unstable if the cylinder deactivated operation is carried out when the outside air temperature TA is lower than the cylinder deactivated operation lower limit outside air temperature #TADECCSL or higher than the cylinder deactivated operation upper limit outside air temperature TADECCSH.

In step S132, it is determined whether coolant temperature TW is within a predetermined range (i.e., a cylinder deactivated operation lower limit coolant temperature #TWDECCSL≦TW≦cylinder deactivated operation upper limit coolant temperature #TWDECCSH). If it is determined in step S132 that the coolant temperature TW is within the predetermined range, the process proceeds to step S133. If it is determined that the coolant temperature TW is not within the predetermined range, the process proceeds to step S144. This is because the engine becomes unstable if the cylinder deactivated operation is carried out when the coolant temperature TW is lower than the cylinder deactivated operation lower limit coolant temperature #TWDECCSL or higher than the cylinder deactivated operation upper limit coolant temperature TWDECCSH.

In step S133, it is determined whether the atmospheric pressure PA is equal to or greater than a cylinder deactivated operation upper limit atmospheric pressure #PADECCS. If the determination result in step S133 is "YES" (i.e., high pressure), the process proceeds to step S134, and if the determination result is "NO", then the process proceeds to step S144. This is because it is not preferable to carry out the cylinder deactivated operation when the atmospheric pressure is low (i.e., there is a possibility, for instance, that the negative pressure in master power of the brake is not secured in a sufficient state when the brake is activated).

In step S134, it is determined whether the voltage VB of the 12V auxiliary battery 4 is equal to or greater than a cylinder deactivated operation upper limit voltage #VBDECCS. If the determination result is "YES" (i.e., the voltage is large), the process proceeds to step S135, and if the determination result is "NO", the process proceeds to step S144. This is because the response of the spool valve 71 is slowed when the voltage VB of the 12V auxiliary battery is smaller than the predetermined value. Also, this has a meaning of countermeasures for battery voltage lowering under low temperature conditions or battery deterioration.

In step S135, it is determined whether a battery temperature TBAT of the battery 3 is equal to or lower than a cylinder deactivation upper limit battery temperature #TBDECCSH. If the determination result is "YES", then the process proceeds to step S136, and if the determination result is "NO", then the process proceeds to step S144.

In step S136, it is determined whether the battery temperature TBAT is equal to or greater than a cylinder deactivation lower limit battery temperature #TBDECCSL. If the determination result is "YES", then the process proceeds to step S137, and if the determination result is "NO", then the process proceeds to step S144.

The reason for the above is because the cylinder deactivated operation should not be carried out when the temperature of the battery 3 is not within a certain range in step S135 and step S136.

In step S137, it is determined whether it is in a deceleration fuel cut state based on whether a deceleration fuel cut flag F_FC is "1" or not. If the determination result is "YES", then the process proceeds to step S138, and if the determination result is "NO", then the process proceeds to step S144. This is because it is necessary, when the cylinder deactivated operation is carried out, that the supply of fuel be stopped in advance.

In step S138, it is determined whether oil temperature TOIL is within a predetermined temperature range (i.e., a cylinder deactivated operation lower limit oil temperature #TODECCSL≦TOIL≦cylinder deactivated operation upper limit oil temperature #TODECCSH). If it is determined in step S138 that the oil temperature TOIL is within the predetermined temperature range, the process proceeds to step S139. If it is determined that the outside air temperature TA is not within the predetermined range, the process proceeds to step S144. This is because the responsiveness for switching engine activation from/to cylinder deactivation is unstabilized if the cylinder deactivated operation is carried out when the oil temperature TOIL is lower than the cylinder deactivated operation lower limit oil temperature #TODECCSL or is higher than the cylinder deactivated operation upper limit oil temperature #TODECCSH.

Figure 3:
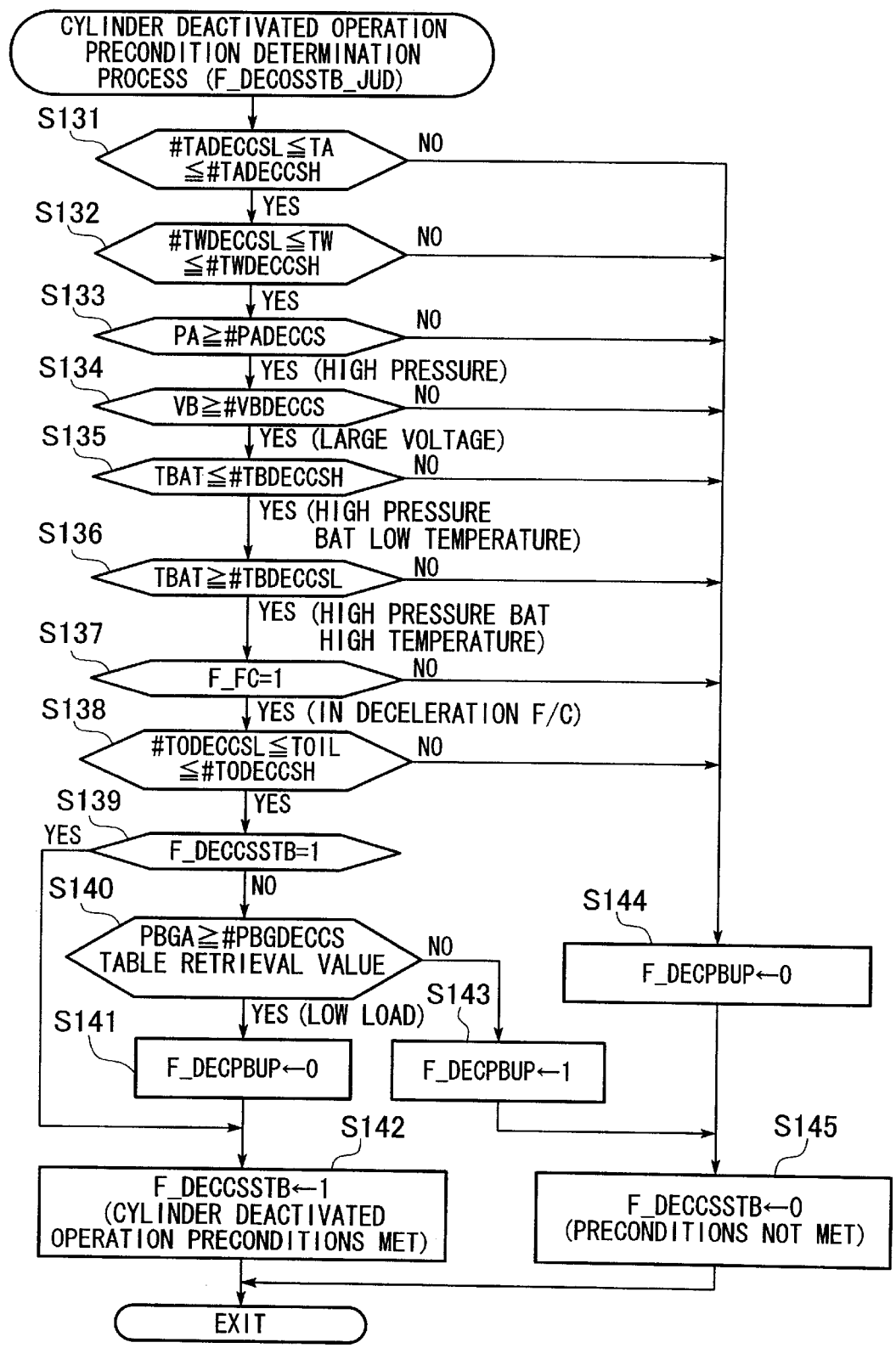
FIG. 3 is a flowchart showing a cylinder deactivated operation precondition determination process in an embodiment according to the present invention.

In step S139, it is determined whether a cylinder deactivation standby flag F_DECCSSTB, which is set as a result of the process shown in FIG. 3, is "1" or not. If the determination result is "YES", then the process proceeds to step S142, and if the determination result is "NO", the process proceeds to step S140.

In step S140, it is determined whether an inlet pipe negative pressure PBGA is equal to or greater than a cylinder deactivated operation upper limit negative pressure #PBGDECCS, which is a table retrieved value determined in accordance with the engine revolution number NE (i.e., a value which becomes smaller (the negative pressure becomes larger) as the engine revolution number becomes larger).

The reason of the above is because the cylinder deactivated operation is not carried out immediately if the engine load is high (i.e., the inlet pipe negative pressure is lower than the cylinder deactivated operation upper limit negative pressure #PBGDECCS), and the inlet pipe negative pressure is used in order to secure the negative pressure in master power prior to the cylinder deactivated operation. If the determination result in step S140 is "YES" (low negative pressure), then the process proceeds to step S141, and if the determination result is "NO" (high negative pressure), then the process proceeds to step S143. In step S143, "1" is set for a deceleration inlet pipe negative pressure increase flag F_DECPBUP, and the process proceeds to step S145.

It is possible to make determination based on a negative pressure in master power MPGA instead of the inlet pipe negative pressure PBGA in step S140.

In step S141, "0" is set for the deceleration inlet pipe negative pressure increase flag F_DECPBUP, and the process proceeds to step S142. In step S142, since the cylinder deactivation preconditions are met, "1" is set for the cylinder deactivation standby flag F_DECCSSTB, and the control is terminated.

In step S144, on the other hand, "0" is set for the deceleration inlet pipe negative pressure increase flag F_DECPBUP, and the process proceeds to step S145. In step S145, since the cylinder deactivation preconditions are not met, "0" is set for the cylinder deactivation standby flag F_DECCSSTB, and the control is terminated.

Here, if the flag value of the above-mentioned deceleration inlet pipe negative pressure increase flag F_DECPBUP is "1", then the secondary air passage 33 is closed under certain conditions, and if the flag value is "0", the secondary air passage 33 is opened under certain conditions.

That is, if it is determined that the load is high in step S140, the secondary air passage 33 is closed because the negative pressure is small (step S143), and the cylinder deactivated operation is not carried out (step S145). Then, the process is performed again from step S131, and when the inlet pipe negative pressure PBGA becomes the predetermined value, the process proceeds to step S141 and to step S142 using the inlet pipe negative pressure as a trigger so that the preconditions for the cylinder deactivated operation are met (i.e., cylinder deactivation standby flag F_DECCSSTB=1).

(Cylinder deactivation cancellation condition determination process)

Figure 4:
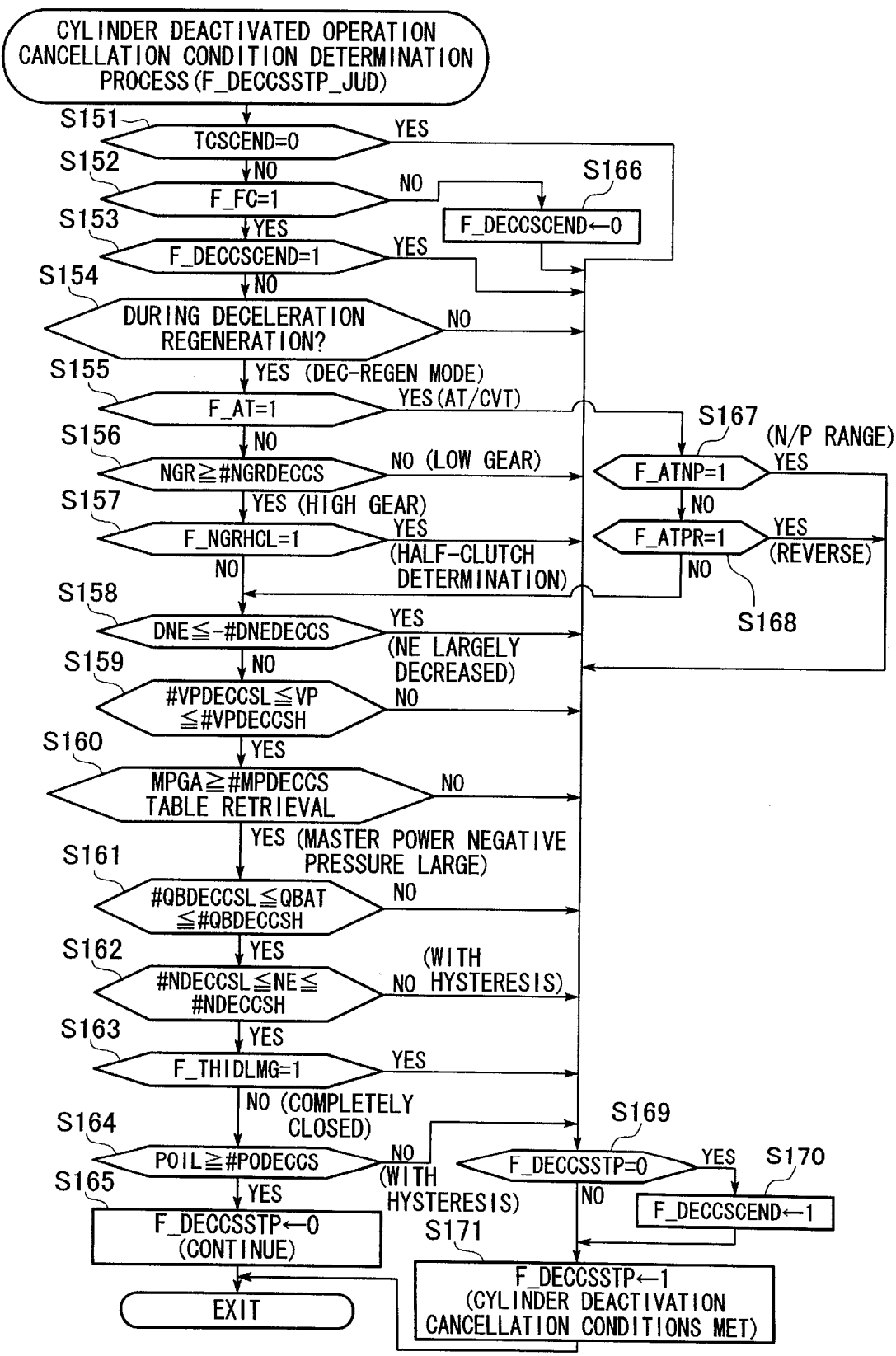
FIG. 4 is a flowchart showing a cylinder deactivated operation cancellation condition determination process in an embodiment according to the present invention.

Next, the cylinder deactivation cancellation condition determination process in step S105 shown in FIG. 2 will be explained in detail with reference to FIG. 4. Note that this process is repeated periodically.

In step S151, it is determined whether the cylinder deactivated operation compulsive cancellation timer TCSCEND is "0" or not. If the determination result is "YES", then the process proceeds to step S169, and if the determination result is "NO", then the process proceeds to step S152. This is because it is necessary, when the cylinder deactivated operation compulsive cancellation timer TCSCEND becomes "0", to cancel the cylinder deactivated operation.

In step S152, it is determined whether the fuel cut flag F_FC is "1" or not. If the determination result in step S152 is "YES", then the process proceeds to step S153, and if the determination result is "NO", then the process proceeds to step S166. The reason why this determination is made is because the purpose of the cylinder deactivated operation is to decrease engine friction during the deceleration fuel cut and to increase the regeneration amount by an amount corresponding to the decreased engine friction amount.

In step S166, "0" is set for the cylinder deactivation termination flag F_DECCSCEND, and the process proceeds to step S169.

In step S153, it is determined whether the cylinder deactivation termination flag F_DECCSCEND is "1" or not. If the determination result is "YES", then the process proceeds to step S169, and if the determination result is "NO", then the process proceeds to step S154.

In step S154, it is determined if it is in a deceleration regeneration state. If the determination result is "YES", the process proceeds to step S155, and if the determination result is "NO", then the process proceeds to step S169.

In step S155, it is determined whether a MT/CVT determination flag F_AT is "1" or not. If the determination result is "NO" (MT vehicle), the process proceeds to step S156. If the determination result is "YES" (AT/CVT vehicle), then the process proceeds to step S167.

In step S167, it is determined whether an in-gear determination flag F_ATNP is "1" or not. If the determination result is "NO" (in-gear), then the process proceeds to step S168. If the determination result is "YES" (N/P range), then the process proceeds to step S169.

In step S168, it is determined whether a reverse position determination flag F_ATPR is "1" or not. If the determination result is "YES" (reverse position), the process proceeds to step S169. If the determination result is "NO" (other than the reverse position), then the process proceeds to step S158.

By the treatment in steps S167 and S168, the cylinder deactivated operation at the N/P range, reverse position is cancelled.

In step S156, it is determined whether a previous gear position NGR is at an Hi gear side with respect to a cylinder deactivation continuation lower limit gear position #NGRDECCS (for instance, third gear position). If the determination result is "YES" (Hi gear side), then the process proceeds to step S157, and if the determination result is "NO" (Lo gear side), then the process proceeds to step S169. This is to prevent decrease in regeneration rate at low gears or frequent switching of the cylinder deactivation during, for instance, a traffic jam.

In step S157, it is determined whether a half-clutch determination flag F_NGRHCL is "1" (half-clutch) or not. If the determination result is "YES" (half-clutch), then the process proceeds to step S169. If the determination result is "NO". then the process proceeds to step S159. Accordingly, it becomes possible, for instance, to prevent unnecessary cylinder deactivation by which generation of engine stall during a half-clutch state to stop the vehicle, or problems due to which a driver's need to accelerate the vehicle cannot be satisfied during a half-clutch state for gear change.

In step S158, it is determined whether the rate of change in the engine revolution number DNE is equal to or greater than the cylinder deactivated operation continuation upper limit engine revolution number rate of change #DNEDECCS. If the determination result is "YES" (i.e., a decreasing rate of the engine revolution number is large), the process proceeds to step S169. If the determination result is "NO", then the process proceeds to step S159. This is to prevent generation of engine stall during the cylinder deactivated operation which is carried out when the decreasing rate of the engine revolution number is large.

In step S159, it is determined whether a vehicle speed VP is within the predetermined range (i.e., cylinder deactivated operation continuation lower limit vehicle speed #VPDECCSL≦VP≦cylinder deactivated operation continuation upper limit vehicle speed #VPDECCSH) or not. As a result of determination in step S159, if it is determined that the vehicle speed VP is within a predetermined range, the process proceeds to step S160. On the other hand, if it is determined that the vehicle speed VP is not within the predetermined range, the process proceeds to step S169. The cylinder deactivated operation is cancelled when the vehicle speed VP is lower than the cylinder deactivated operation continuation lower limit vehicle speed #VPDECCSL or higher than the cylinder deactivated operation continuation upper limit vehicle speed #VPDECCSH.

In step S160, it is determined whether the negative pressure in master power MPGA is equal to or greater than a cylinder deactivated operation continuation upper limit negative pressure #MPDECCS or not. Here, the cylinder deactivate operation continuation upper limit #MPDECCS is a table retrieved value which is set in accordance with the speed of vehicle VP (a value which becomes smaller (i.e., the negative pressure becomes larger) as the speed of vehicle increases). This is because it is preferable that the negative pressure in master power MPGA be set in accordance with the kinetic energy of the vehicle, i.e., the speed of vehicle VP, by taking into account the fact that the negative pressure in master power MPGA is used to stop the vehicle.

As a result of the determination made in step S160, if the negative pressure in master power MPGA is equal to or greater than the cylinder deactivated operation continuation upper limit negative pressure #MPDECCS (i.e., the negative pressure in master power is large), the process proceeds to step S161. As a result of the determination made in step S160, if the negative pressure in master power MPGA is less than the cylinder deactivated operation continuation lower limit negative pressure #MPACLS (i.e., the negative pressure in master power is small), the process proceeds to step S169. This is because it is not preferable to continue the cylinder deactivated operation when a sufficient negative pressure in master power MPGA cannot be obtained.

In step S161, it is determined whether a battery remaining charge QBAT is within a predetermined range (i.e., cylinder deactivated operation continuation lower limit remaining charge #QBDECCSL≦QBAT≦cylinder deactivated operation continuation upper limit remaining charge #QBDECCSH). As a result of the determination made in step S161, if it is determined that the battery remaining charge QBAT is within the predetermined range, the process proceeds to step S162. If it is determined that the battery remaining charge QBAT is not within the predetermined range, the process proceeds to step S169. If the battery remaining charge QBAT is lower than the cylinder deactivated operation continuation lower limit remaining charge #QBDECCSL or higher than the cylinder deactivated operation continuation upper limit remaining charge #QBDECCSH, the cylinder deactivated operation is cancelled. This is because energy required for auxiliary driving of the engine by the motor M, which is carried out when returning from the cylinder deactivated operation, cannot be secured if the battery remaining charge QBAT is too small. Also, if the battery remaining charge QBAT is too large, regeneration cannot be performed.

In step S162, it is determined whether the engine revolution number NE is within a predetermined range (i.e., cylinder deactivated operation continuation lower limit engine revolution number #NDECCSL≦NE≦cylinder deactivated operation continuation upper limit engine revolution number #NDECCSH). As a result of the determination in step S162, if it is determined that the engine revolution number NE is within the predetermined range, the process proceeds to step S163. If it is determined that the engine revolution number NE is not within the predetermined range, the process proceeds to step S169. If the engine revolution number NE is lower than the cylinder deactivated operation continuation lower limit engine revolution number #NDECCSL or higher than the cylinder deactivated operation continuation upper limit engine revolution number #NDECCSH, the cylinder deactivated operation is cancelled. This is because the regeneration efficiency may be low or oil pressure for switching to the cylinder deactivated operation cannot be secured if the engine revolution number NE is low. Also if the engine revolution number NE is too large, it may not be possible to switch to the cylinder deactivated operation due to high oil pressure caused by the large engine revolution number, or there is a danger that consumption of hydraulic oil for a cylinder deactivated operation is deteriorated.

In step S163, it is determined whether an IDLE determination flag F_THIDLMG is "1" or not. If the determination result is "YES" (i.e., not completely closed), the process proceeds to step S169. If the determination result is "NO" (i.e., completely closed), then the process proceeds to step S164. This is to cancel the continuation of the cylinder deactivated operation when the throttle is opened at any degree from the completely closing state thereof in order to improve salability.

In step S164, it is determined whether the engine oil pressure POIL is equal to or larger than a cylinder deactivated operation continuation lower limit oil pressure #PODECCS (with hysteresis). If the determination result is "YES", then the process proceeds to step S165. If the determination result is "NO", then the process proceeds to step S169. This is because oil pressure for enabling the cylinder deactivated operation (for instance, oil pressure of activating the spool valve 71) cannot be obtained if the engine oil pressure POIL is lower than the cylinder deactivated operation continuation lower limit oil pressure #PODECCS.

In step S165, since the conditions for the cylinder deactivated operation cancellation are not satisfied, "0" is set for a cylinder deactivation cancellation conditions met flag F_DECCSSTP in order to continue the cylinder deactivated operation, and the control is terminated.

In step S169, it is determined whether a cylinder deactivation cancellation conditions met flag F_DECCSSTP, which shows a result of the process shown in the flowchart, is "0" or not. If the determination result is "YES", then the process proceeds to step S170. If the determination result is "NO", then the process proceeds to step S171.

In step S170, "1" is set for a cylinder deactivation termination flag F_DECCSCEND, and the process proceeds to step S171. In step S171, since the cylinder deactivation cancellation conditions are satisfied, "1" is set for the cylinder deactivation cancellation conditions met flag F_DECCSSTP, and the control is terminated.

Here, the above-mentioned cylinder deactivation termination flag F_DECCSCEND is a flag provided for not canceling the cylinder deactivation unless the deceleration fuel cut is once terminated and returns to the all cylinder operation state, and the flag is used to prevent hunting.
(Gradual fuel addition coefficient calculation process after returning from cylinder deactivation F/C (fuel cut))

Figure 5:
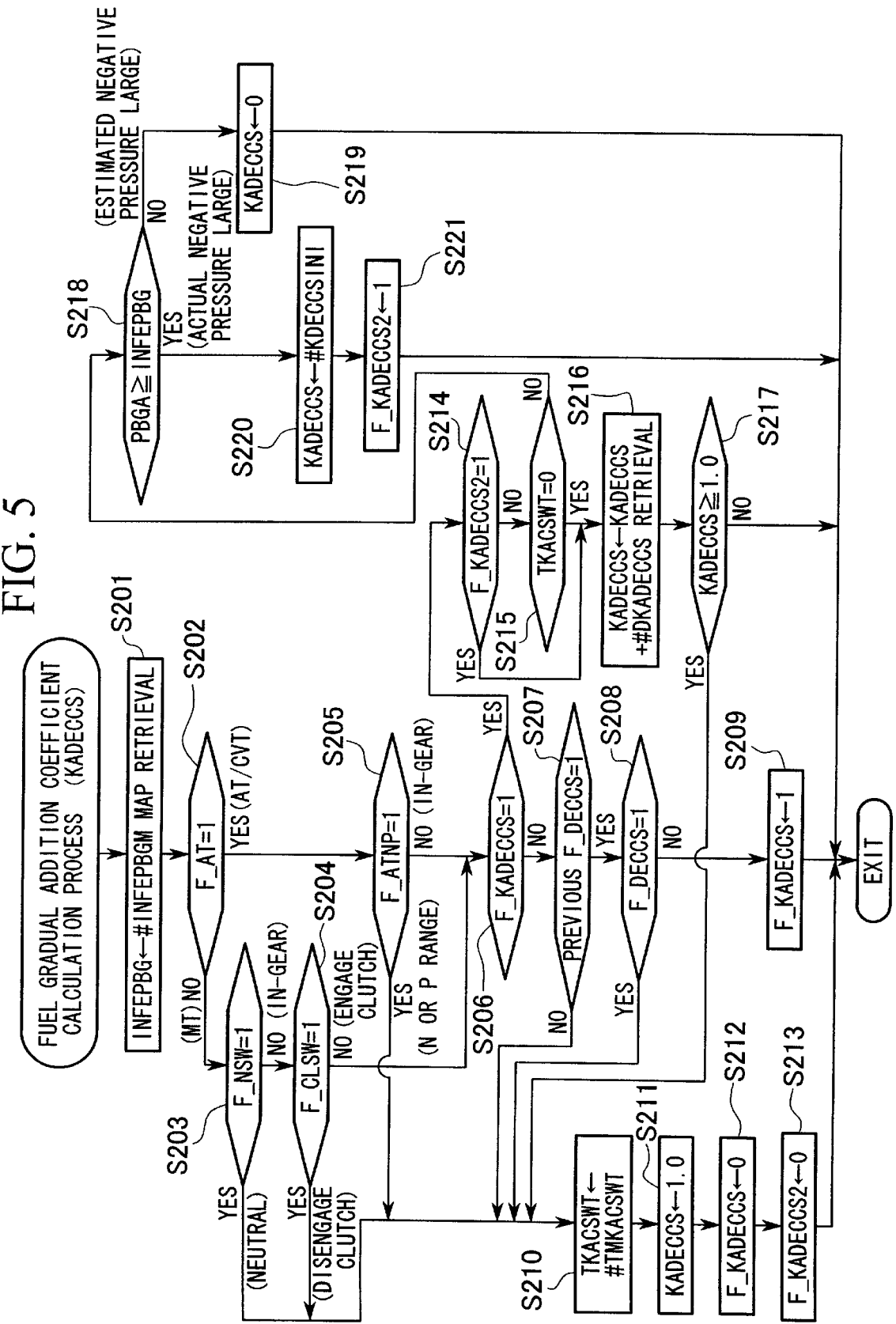
FIG. 5 is a flowchart showing a fuel gradual addition coefficient calculation process in an embodiment according to the present invention.

Next, a gradual fuel addition coefficient calculation process after returning from a cylinder deactivation fuel cut will be explained in detail with reference to FIG. 5. By this process, since shock is caused if fuel is supplied immediately after retuning to the all cylinder operation from the cylinder deactivated operation, supply of fuel is prohibited until certain conditions are satisfied in order to secure a smooth transition to the all cylinder operation by gradually increasing the amount of fuel supplied starting from an initial amount level which is less than an ordinary amount.

In the process specifically explained below, setting of a gradual fuel addition coefficient after returning from a cylinder deactivation fuel cut (hereinafter simply referred to as a gradual addition coefficient KADECC), and setting and resetting of a gradual addition flag F_KADECCS for fuel, which mainly shows if a gradual addition of fuel is carried out or not, are performed. Here, the gradual addition coefficient KADECCS returned from the fuel cut indicates a multiplying ratio to an ordinary fuel amount and the maximum value thereof is 1.0. Accordingly, the supply of fuel is stopped when the gradual addition coefficient KADECCS= 0. Note that this process is carried out periodically.

In step S201 (estimated intake gas negative pressure calculation means), an estimated inlet pipe negative pressure (estimated intake gas negative pressure) INFEPBG is retrieved from a #INFEPBGM map based on the engine revolution number NE and a throttle opening degree TH, and the process proceeds to step S202.

In step S202, it is determined whether a MT/CVT determination flag FEAT is "1" or not. If the determination result is "YES" (AT vehicle, CVT vehicle), the process proceeds to step S205. If the determination result is "NO" (MT vehicle), then the process proceeds to step S203.

In step S203, it is determined whether a neutral switch flag F_NSW is "1" of not. If the determination result is "YES" (neutral), the process proceeds to step S210. If the determination result is "NO" (in-gear), then the process proceeds to step S204.

A timer value #TMKACSWT is set for an inlet pipe negative pressure determination permit timer TKACSWT in step S210, 1.0 is set for the gradual addition coefficient KADECCS in step S211, "0" is set for the gradual addition flag F_KADECCS in step S212, "0" is set for a gradual addition initial value setting flag F_KADECCS2 in step S213, and the above-explained process is repeated.

In step S204, it is determined whether a clutch switch flag F_CLSW is "1" or not. If the determination result is "YES" (disengage clutch), the process proceeds to step S210. If the determination result is "NO" (engage clutch), then the process proceeds to step S206.

In step S205, it is determined whether an in-gear determination flag F_ATNP for CVT is "1" or not. If the determination result is "YES" (N, P range), the process proceeds to step S210. If the determination result is "NO" (in-gear), then the process proceeds to step S206.

In step S206, it is determined whether a gradual addition flag F_KADECCS set in this process is "1" or not. If the determination result is "YES", the process proceeds to step S214, and if the determination result is "NO", then the process proceeds to step S207. Here, if the gradual addition flag F_KADECCS is "1", it means that the gradual addition of fuel is carried out. On the other hand, if the flag value is "0", it means that the gradual addition of fuel is not carried out.

In step S207, it is determined whether the previous cylinder deactivated operation flag F_DECCS is "1" or not. If the determination result is "YES", the process proceeds to step S208, and if the determination result is "NO", then the process proceeds to step S210.

In step S208, it is determined whether the cylinder deactivated operation flag F_DECCS is "1" or not. If the determination result is "YES", the process proceeds to step S210, and if the determination result is "NO", then the process proceeds to step S209.

In step S209, "1" is set for the gradual addition flag F_KADECCS, and the above-explained process is repeated.

In step S214, it is determined whether the gradual addition initial value setting flag F_KADECCS2 is "1" or not. If the determination result is "YES", the process proceeds to step S216, and if the determination result is "NO", then the process proceeds to step S215.

In step S215, it is determined whether the timer value of the inlet pipe negative pressure determination permit timer TKACSWT set in step S210 is "0" or not. If the determination result is "YES", the process proceeds to step S216, and if the determination result is "NO", then the process proceeds to step S218.

In step S216, a new gradual addition coefficient KADECCS is set by adding a gradual addition value #DKAKECCS to the gradual addition coefficient KADECCS, and the process proceeds to step S217. Here, the gradual addition value #DKADECCS is a value which increases as the throttle opening degree TH increases, and may be obtained by, for instance, table retrieval.

In step S217, it is determined whether the gradual addition coefficient KADECCS is "1.0" or not. If the determination result is "YES", the process proceeds to step S210, and if the determination result is "NO", then the above-explained process is repeated.

In step S218, it is determined whether an actual inlet pipe negative pressure PBGA$\geq$estimated inlet pipe negative pressure INFEPBG. If the determination result is "YES" (actual negative pressure is larger), the process proceeds to step S220, and if the determination result is "NO" (estimated negative pressure is larger), then the process proceeds to step S219. That is, the process proceeds to step S219 if the actual inlet pipe negative pressure is larger than the estimated inlet pipe negative pressure INFEPBG immediately after being switched to the all cylinder operation state from the cylinder deactivated operation state. Thereafter, when the actual inlet pipe negative pressure PBGA becomes equal to or larger than the estimated inlet pipe negative pressure INFEPBG, the process proceeds to step S220.

In step S219, "0" is set for the gradual addition coefficient KADECCS, and the above process is repeated.

An initial value #KDECCSINI of the gradual addition coefficient is set for the gradual addition coefficient KADECCS in step S220, and "1" is set for the gradual addition initial value setting flag F_KADECCS2 in step S221, and the above-explained process is repeated.

Accordingly, if the operation state is switched to the all cylinder operation state from the cylinder deactivated operation state due to, for instance, reacceleration when the vehicle is in the in-gear state, "1" is set for the gradual addition flag F_KADECCS in step S209. Then, the process proceeds to step S206 to step S214, and step S215 to step S218 since the timer value of the inlet pipe negative pressure determination permit timer TKACSWT initially set in step S210 is not "0". In step S218, the actual inlet pipe negative pressure PBGA is compared with the estimated inlet pipe negative pressure INFEPBG.

Figure 7:
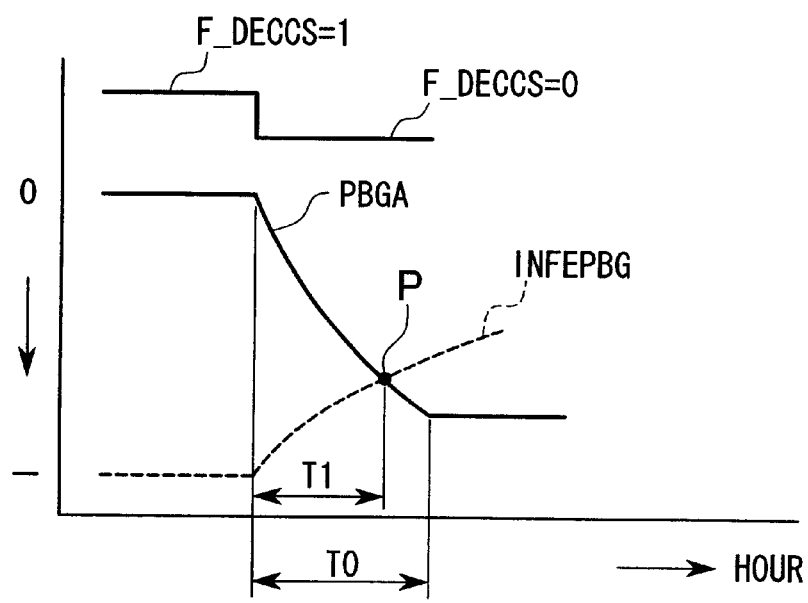
FIG. 7 is a graph showing a state where an actual intake gas negative pressure matches an estimated intake gas negative pressure in an embodiment according to the present invention.

As indicated in the graph shown in FIG. 7, since the estimated inlet pipe negative pressure INFEPBG is large (i.e., the negative pressure is large) with respect to the actual inlet pipe negative pressure PBGA immediately after being switched to the all cylinder operation state to the cylinder deactivated operation state, the determination result made in step 218 becomes "NO", and "0" is set for the gradual addition coefficient KADECC in the subsequent step S219.

Accordingly, since no wasteful fuel supply is made within the range of time T1 shown in FIG. 7, the fuel is not consumed uselessly, and hence this can be contributed to improve the fuel consumption efficiency of the vehicle.

When the actual inlet pipe negative pressure PBGA becomes equal to the estimated inlet pipe negative pressure INFEPBG at the point P shown in FIG. 7, the determination made in step S218 becomes "YES", and an initial value #KDECCSINI (for instance, 0.3) of the gradual addition coefficient is set for the gradual addition coefficient KADECCS in step S220. Note that an initial value less than an ordinary fuel supply amount means a value obtained by multiplying the ordinary fuel supply amount by the initial value #KDECCSINI of the gradual addition coefficient.

Here, since the initial value #KDECCSINI of the gradual addition coefficient is smaller than the gradual addition coefficient KADECCS, which corresponds to the ordinary fuel supply amount, the corresponding fuel supply amount becomes smaller than the ordinary fuel supply amount. In this manner, it becomes possible to prevent generation of shock to a minimum level.

Also, it becomes possible to quicken the timing of fuel injection (T1<T0) as compared with the case where fuel is supplied with an interval time T0 during which the actual inlet pipe negative pressure PBGA completely recovers, and the slope of the estimated inlet pipe negative pressure INFEPBG shown in FIG. 7 increases as the throttle opening degree increases where acceleration demand is high. Accordingly, salability can be improved by securing responsibility corresponds to the acceleration demand of a driver during a reacceleration state since the time T1 until a restart of the fuel injection can be shortened.

Then, in step S221, "1" is set for the initial value #KDECCSINI of the gradual addition coefficient, i.e., the gradual addition initial value setting flag F_KADECCS2 which indicates setting of an initial value of the fuel supply amount, and when proceeds to step S214 from step S206, fuel is supplied, an amount of which is increased by the gradual addition amount #DKADECCS, in step S216 since the determination result in step S214 is "YES". Thereafter, the amount of fuel supplied is gradually increased as in the above-mentioned manner, and when the gradual addition coefficient KADECCS reaches 1.0, i.e., the ordinary fuel supply amount, in step S217, the inlet pip negative pressure determination permit timer TKACSWT is set in step S210, "1.0" is set in the gradual addition coefficient KADECCS in step S211, the gradual addition flag F_KADECCS is set in step S212, the gradual addition flag F_KADECCS is reset in step S212, and the gradual addition initial value setting flag F_KADECCS2 is reset in step S213.

Accordingly, since the fuel supply can be quicker as compared with the case where an ordinary amount of fuel is supplied after the inlet pipe negative pressure is recovered, it becomes possible to quickly accelerate the vehicle so as to corresponds to the drivers' intention, and hence the salability thereof can be improved. Also, since a fuel supply of ordinary amount is prohibited until the actual inlet pipe negative pressure becomes equal to the estimated inlet pipe negative pressure, it becomes possible to prevent consumption of unnecessary fuel as compared with the case where an ordinary amount of fuel is supplied though sufficient inlet pipe negative pressure is not secured, and hence the fuel consumption efficiency can be improved.

Also, since a smaller amount of fuel, as compared to an ordinary amount of fuel, is supplied at the same time the vehicle is reaccelerated, it a smooth acceleration can be realized. Moreover, a proper amount of fuel corresponding to the inlet pipe negative pressure can be supplied without wasting the fuel, as compared with the case where an ordinary amount of fuel is supplied during reacceleration, and hence the fuel consumption efficiency can be improved.

Further, since the above-explained gradual addition value #DKADECCS is a value which increases as the throttle opening degree TH increases, the time for restarting the fuel injection can be shortened further as the throttle opening degree TH becomes larger where the acceleration demand is high. Accordingly, the salability during reacceleration after returning from the cylinder deactivation can be improved.

(Retard process when returned from a cylinder deactivated operation)

Figure 6:
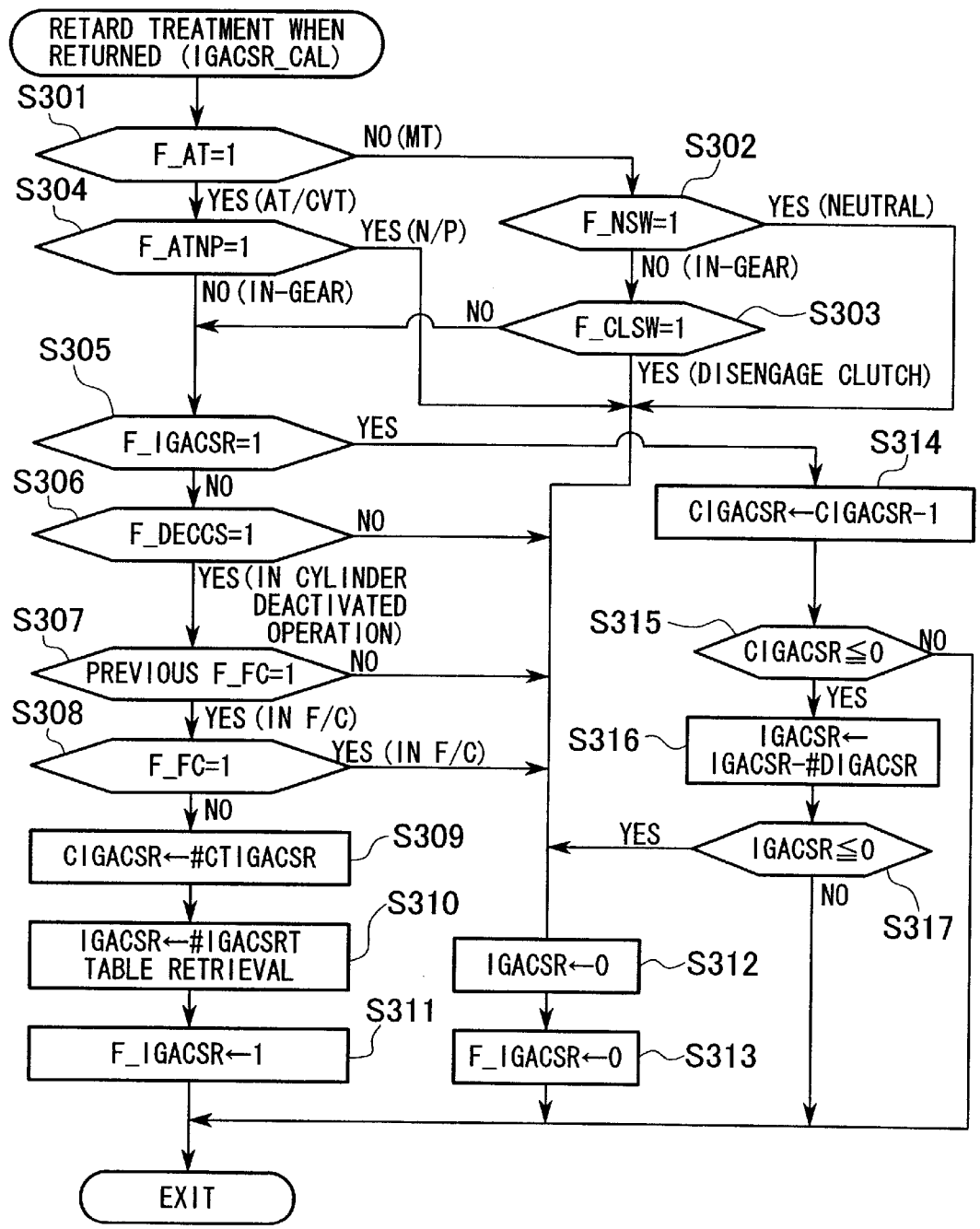
FIG. 6 is a flowchart showing a retard treatment when returned from a cylinder deactivated operation in an embodiment according to the present invention.

Next, a retard process which is carried out when returned from a cylinder deactivated operation state according to an embodiment of the present invention will be explained in detail with reference to FIG. 6.

The retard process is carried out to delay an ignition timing to suppress the output of the engine thereby decreasing generation of shock during reacceleration. The retard process is performed after being returned to the all cylinder operation state from the cylinder deactivated operation state. Note that this process is repeated periodically.

In step S301, it is determined whether a MT/CVT determination flag F_AT is "1" or not. If the determination result is "YES" (AT vehicle, CVT vehicle), the process proceeds to step S304, and if the determination result is "NO" (MT vehicle), then the process proceeds to step S302.

In step S302, it is determined whether a neutral switch flag F_NSW is "1" or not. If the determination result is "YES" (neutral), the process proceeds to step S312, and if the determination result is "NO" (in-gear), then the process proceeds to step S303.

In step S303, it is determined whether a clutch switch flag F_CLSW is "1" or not. If the determination result is "YES" (disengaged clutch), the process proceeds to step S312, and if the determination result is "NO" (engaged clutch), then the process proceeds to step S305.

In step S304, it is determined whether a CVT in-gear flag F_ATNP is "1" or not. If the determination result is "YES" (N, P range), the process proceeds to step S312, and if the determination result is "NO" (in-gear), then the process proceeds to step S305.

In step S312, "0" is set for a retard amount IGACSR, and "0" is set for an ignition timing control flag F_IGACSR in the subsequent step S313, and the above process is repeated. Here, the retard amount is a value expressed by an angle.

In step S305, it is determined whether the ignition timing control flag F_IGACSR is "1" or not. If the determination result is "YES", the process proceeds to step S314, and if the determination result is "NO", then the process proceeds to step S306.

In step S306, it is determined whether a cylinder deactivated operation flag F_DECCS is "1" or not. If the determination result is "YES" (in the cylinder deactivated operation), the process proceeds to step S307, and if the determination result is "NO", then the process proceeds to step S312.

In step S307, it is determined whether a previous fuel cut flag F_FC is "1" or not. If the determination result is "YES" (in the fuel cut), the process proceeds to step S308, and if the determination result is "NO", then the process proceeds to step S312.

In step S308, it is determined whether the fuel cut flag F_FC is "1" or not. If the determination result is "YES", the process proceeds to step S312, and if the determination result is "NO", then the process proceeds to step S309.

In step S309, a predetermined value #CTIGACSR (for instance, 3) is set for a hold counter CIGACSR, and the process proceeds to step S310. The predetermined value set by the counter is determined so as to correspond to the time between reacceleration and matching of the actual inlet pipe negative pressure PBGA with the estimated inlet pipe negative pressure INFEPBG in the above-mentioned fuel gradual addition coefficient calculation process.

In step S310, the retard amount IGACSR (predetermined amount retard) is set by retrieving through the #IGACSRT table, and the process proceeds to step S311. Note that the #IGACSRT table is a value set in accordance with the throttle opening degree TH, and becomes smaller as the throttle opening degree TH becomes larger (high opening degree).

In step S311, "1" is set for the ignition timing control flag F_IGACSR and the above process is repeated.

In step S314, the value of the hold counter CIGASCSR is count down, and the process proceeds to step S315.

In step S315, it is determined whether the counter value of the hold counter CIGACSR is equal to or smaller than "0". If the determination result is "YES", the process proceeds to step S316. If the determination result is "NO", then the above process is repeated.

In step S316, a gradual subtraction value #DIGACSR is subtracted from the retard amount IGACSR, and the process proceeds to step S317. The gradual subtraction value #DIGACSR is set to be a value which makes the retard amount IGACSR "0" in accordance with the time (T0–T1) between the start of the fuel supply and the time the amount of fuel reaches the ordinary amount.

In step S317, it is determined whether the retard amount IGACSR is equal to or smaller than "0". If the determination result is "YES", then the process proceeds to step S312. If the determination result is "NO", then the above process is repeated.

Accordingly, if the operation state is switched to the all cylinder operation state by, for instance, reacceleration, from the cylinder deactivated operation when the vehicle is in an in-gear state, the determination made in step S305 becomes "NO" since the ignition timing control flag F_IGACSR is initially "0", and the determination result becomes "YES" since the value of cylinder deactivated operation flag F_DECCS is "1" immediately after reacceleration.

Then, in step S309, a predetermined value #CTIGACSR is set in the counter CGASCR since the previous fuel cut flag F_FC is "1" in step S307 and the current fuel cut flag F_FC is "0" in step S309, and a retard amount IGACSR, which becomes an initial value of the retard amount, is retrieved through the #IGACSR table in step S310. In step S311, an ignition timing control flag F_IGACSR is set.

Figure 8:
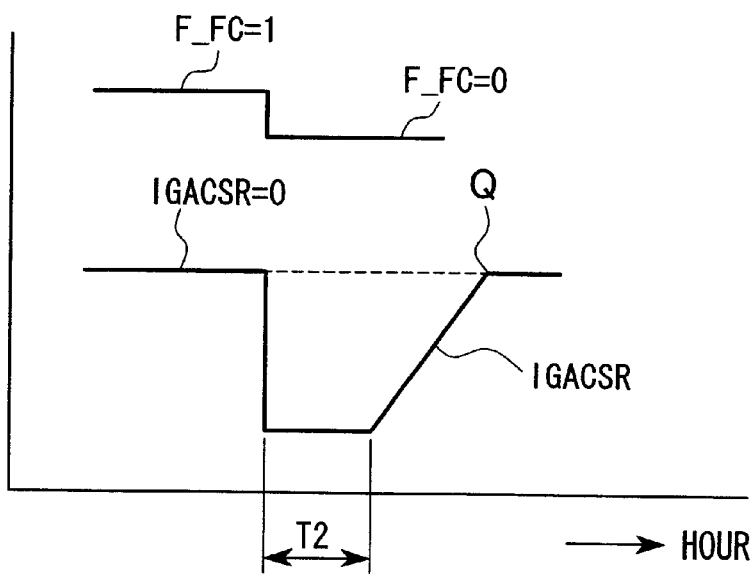
FIG. 8 is a graph indicating a retard treatment in an embodiment according to the present invention.

Thereafter, the process proceeds to step S314 from step S305, and its state (initial value of the retard amount) is maintained (time T2) as shown in FIG. 8 until the hold counter CIGACSR becomes "0", and the gradual subtraction value #DIGACSR is subtracted from the retard amount IGACSR in step S316 when the hold counter CIGACSR becomes "0" to decrease the delay of ignition timing. By shifting the timing to start decreasing the retard amount towards the time T1 by the hold counter, it becomes possible to surely prevent the generation of shock.

Then, when the retard amount IGACSR gradually decreases and becomes "0" (i.e., the point Q in FIG. 8) in step S317, "0" is set for the retard amount IGACSR in step S312, and the ignition timing control flag F_IGACSR is reset in step S313.

Accordingly, a return shock immediately after switching to the all cylinder operation can be prevented by gradually increasing the amount of fuel supplied and using the retard control of the ignition timing after returning to the all cylinder operation state from the cylinder deactivated operation state.

Next, a second embodiment according to the present invention will be described with reference to the flowchart shown in FIG. 12. In the first embodiment, when returning to the all cylinder operation state from the cylinder deactivated state, the vehicle cannot be accelerated if there is a fuel supply interval. Accordingly, in the second embodiment, an amount of fuel smaller than the ordinary amount is supplied between the period immediately after returning to the all cylinder operation state and the time the actual inlet pipe negative pressure PBGA becomes equal to the estimated inlet pipe negative pressure INFEPBG so as to secure a certain level of engine output.

Figure 12:
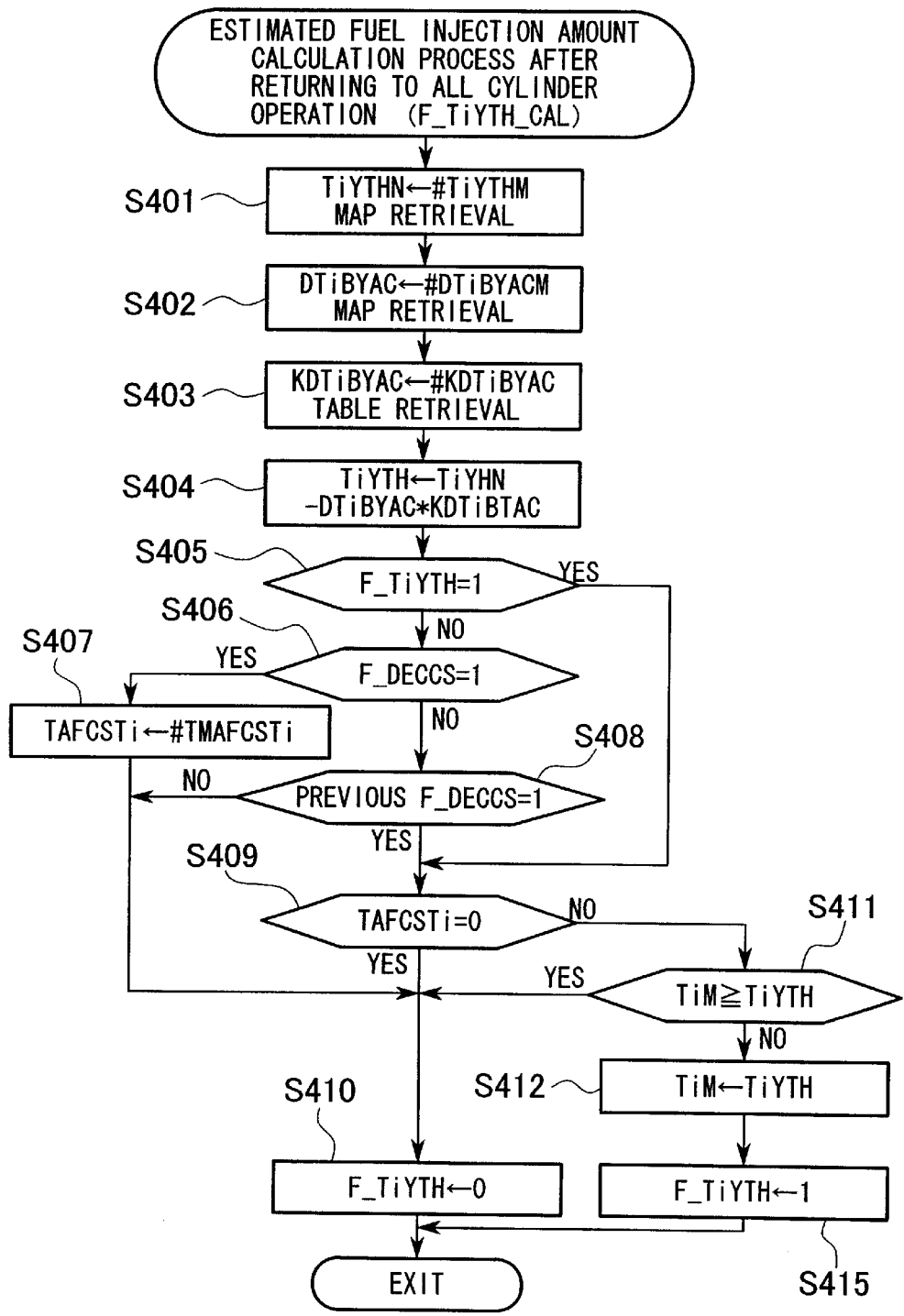
FIG. 12 is a flowchart showing an estimated fuel injection amount calculation process after returning to an all cylinder operation state in an embodiment according to the present invention.

The flowchart shown in FIG. 12 shows an estimated fuel injection amount calculation process (F_TiYTH_CAL) after returning to the all cylinder operation state. In this process, a basic fuel injection amount TiM (corresponds to the actual inlet pipe negative pressure PBGA), which is determined by the engine revolution number NE and the current inlet pipe negative pressure HPB, is compared with a fuel injection amount TiYTH (corresponds to the estimated inlet pipe negative pressure PBGBYTH (same as the INFEPBG), which is determined by the engine revolution number NE and the throttle opening degree TH, and the smaller amount of fuel is supplied.

In step S401, the fuel injection amount TiYTHN is retrieved through the fuel injection amount map, and the process proceeds to step S402. Through the map, the fuel injection amount TiYTHN is obtained based on the engine revolution number NE and the throttle opening degree TH.

In step S402, a fuel injection amount correction value DTiBYAC which flows through the secondary air passage 33 is retrieved through the #DTiBYACM map, and the process proceeds to step S403. This map is used to obtain the fuel injection amount correction value DTiBYAC which flows through the secondary air passage 33 using the engine revolution number NE and the throttle opening degree TH.

In step S403, a correction conversion value KDTiBYAC, which is obtained by a conversion using the fuel injection amount correction value DTiBYAC obtained in step S402 as a coefficient, is retrieved through the #KDTiBYAC table, and the process proceeds to step S404. The correction conversion value KDTiBYAC is a value which increases so as to correspond to a command value ICMD.

In step S404, a fuel injection amount TiYTH is obtained, taking into account the fuel amount correction flows through the secondary air passage 33, by subtracting the fuel injection amount correction value DTiBYAC multiplied by the correction conversion value KDTiBYAC from the fuel injection amount TiYTHN.

Then, in step S405, it is determined whether a fuel injection amount estimation amount flag F_TIYTH, which is set as a result of the process in this flowchart, is "1" or not. If the determination result is "YES", then the process proceeds to step S409, and if the determination result is "NO", the process proceeds to step S406.

In step S406, it is determined whether the cylinder deactivated operation flag F_DECCS is "1" or not. If the determination result is "YES", the process proceeds to step S407, and if the determination result is "NO", the process proceeds to step S408.

In step S407, a predetermined value #TAFCSTi (predetermined time) is set for the timer TAFCSTi, and the process proceeds to step S410. Here, the predetermined value #TAFCSTi is, for instance, 2 seconds.

In step S408, it is determined whether the previous value of the cylinder deactivated operation flag F_DECCS is "1" or not. If the determination result is "YES", the process proceeds to step S409, and if the determination result is "NO", the process proceeds to step S410.

In step S409, it is determined whether the timer TAFCSTi is "0" or not. If the determination result is "YES", the process proceeds to step S410, and if the determination result is "NO", the process proceeds to step S411.

In step S410, "0" is set for the fuel injection amount estimation process flag F_TiYTH, and the process is terminated.

In step S411, it is determined whether the basic fuel injection amount TiM is equal to or greater than the fuel injection amount TiYTH. If the determination result is "YES" and the basic fuel injection amount TiM is larger, the process proceeds to step S410, and if the determination result is "NO" and the fuel injection amount TiYTH is larger, the process proceeds to step S412.

In step S412, the fuel injection amount TiYTH is set for the basic fuel injection amount TiM by taking into account the fuel flowing through the secondary air passage, and "1" is set for the fuel injection amount estimation process flag F_TIYTH in step S415, and the process is terminated.

That is, in this embodiment, immediately being returned to the all cylinder operation state from the cylinder deactivated operation state, an injection amount of fuel smaller than the ordinary amount is set before a certain period of time has been elapsed (step S409) counted by the timer set in step S407, when the fuel injection amount TiYTH is larger than the basic fuel injection amount TiM (i.e., TiM<TiYTH). On the other hand, if the basic fuel injection amount TiM is equal to or larger than the fuel injection amount TiYTH (TiM≧TiYTH), "0" is set for the fuel injection amount estimation process flag F_TiYTH to perform an injection of fuel based on the basic fuel injection amount TiM.

Note that the fuel injection amount estimation flag F_TIYTH becomes zero in step S410 when the above-mentioned timer TAFCSTi=0, and hence no fuel injection amount estimation process is performed. Accordingly, if the fuel injection amount estimation process is not carried out for any reason, an ordinary fuel injection based on the basic fuel injection amount TiM is performed.

According to this embodiment, since a small amount of fuel can be supplied immediately after being returned to the all cylinder operation state from the cylinder deactivated operation state, an acceleration performance can be maintained while minimizing the deterioration in fuel consumption efficiency as compared to the case where no fuel is supplied until the estimated inlet pipe negative pressure matches the actual inlet pipe negative pressure. Also, as compared with the case where a normal injection amount of fuel is supplied when returned to the all cylinder operation state, it becomes possible to prevent the generation of shock and to improve the fuel consumption efficiency. Note that although the above explanation on the second embodiment has been made with the treatments in the first embodiment as prerequisites, it is possible to apply the second embodiment without the treatments in the first embodiment.

Figure 13:
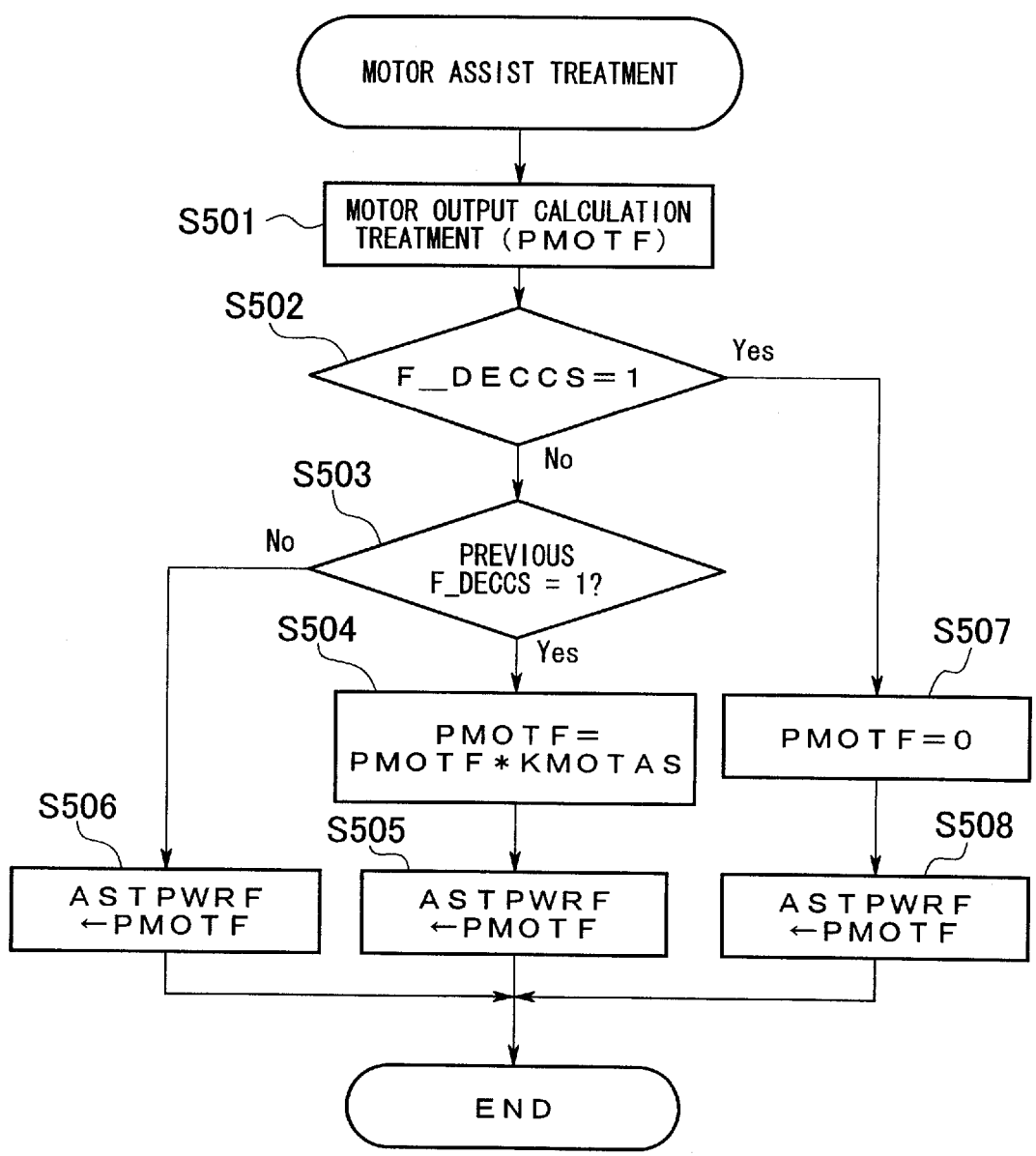
FIG. 13 is a flowchart showing a motor assist treatment in an embodiment according to the present invention.

Next, the third embodiment according to the present invention will be explained with reference to the flowchart shown in FIG. 13. This embodiment is to prevent deterioration in the acceleration performance using a motor assisting the driving of engine when returned to the all cylinder operation state from the cylinder deactivated operation state, and utilizes the treatments in the first embodiment, which are carried out thereafter, as the prerequisites. That is, the acceleration performance is secured by the driving assist of the motor immediately after returning to the all cylinder operation state until the actual inlet pipe negative pressure PBGA matches the estimated inlet pipe negative pressure INFEPBG. Note that since the time in which the motor assists the drive is short, the influence of the motor on the remaining charge of the battery 3 is small. The motor assist treatment will be explained with reference to the flowchart shown in FIG. 13.

In step S501, a motor output calculation treatment is carried out, and the process proceeds to step S502. The treatment is to set a motor output final command value PMOTF, which is defined in accordance with the engine revolution number NE, and the throttle opening degree TH.

In step S502, it is determined whether the cylinder deactivated operation flag F_DECCS is "1" or not. If the determination result is "YES", then the process proceeds to step S507, and if the determination result is "NO", the process proceeds to step S503.

In step S507, "0" is set for the motor output final command value PMOTF, and the motor output final command value PMOTF, i.e., "0", is set for an assist command value ASTPWRF in step S508, and the process is terminated. That is no driving assist by the motor is performed in this case.

In step S503, it is determined whether the previous value of the cylinder deactivated operation flag FDECCS is "1" or not. If the determination result is "YES", then the process proceeds to step S504, and if the determination result is "NO", the process proceeds to step S506.

In step S506, the motor output final command value PMOTF is set for the assist command value ASTPWRF, and the process is terminated.

In step S504, the motor output final command value PMOF is multiplied by a correction coefficient KMOTAS (smaller than 1) for when returned to the all cylinder operation state, and the resultant value is set for the motor output final command value PMOTF. By using the motor output final command value PMOF multiplied by the correction coefficient KMOTAS, the driving assist is carried out by the motor with a small output until the supply of fuel is restarted so that the acceleration performance is not deteriorated.

Then, in step S505, the motor output final command value PMOTF is set for the assist command value ASTPWRF, and the process is terminated.

Accordingly, in this embodiment also, the salability can be maintained by preventing the deterioration in acceleration performance immediately after returning to the all cylinder operation state from the cylinder deactivated state, and by minimizing the deterioration in acceleration performance between a time interval that the actual inlet pipe negative pressure matches the estimated inlet pipe negative pressure and the fuel is supplied in the first embodiment.

Having thus described an exemplary embodiment of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only: the invention is limited and defined only by the following claims and equivalents thereto.

What is claimed is:

1. A control device for a hybrid vehicle provided with an engine including a plurality of cylinders and a motor as driving sources, in the vehicle a supply of fuel to the engine during a deceleration state of the vehicle is stopped and a regeneration control is performed by the motor in accordance with the state of deceleration, and the engine is a cylinder deactivatable engine capable of switching to an all cylinder operation state from a cylinder deactivated operation state in which at least one of the cylinders is deactivated, and vice versa, so that a cylinder deactivated operation of the engine is carried out in accordance with an operation state of the vehicle during deceleration, the control device comprising:

an actual intake gas negative pressure detection unit which detects an intake air negative pressure for the engine;

an estimated intake gas negative pressure calculation unit which estimates an intake air negative pressure based on a revolution number of the engine and an opening degree of a throttle, both the actual intake gas negative pressure detection unit and the estimated intake gas negative pressure calculation unit being used when the operation state of the engine is switched to the all cylinder operation state from the cylinder deactivated operation state, and a supply of fuel to the engine is about to be restarted by a fuel supply amount control unit; and, an engine control unit which compares an actual intake gas negative pressure obtained by the actual intake gas negative pressure detection unit with an estimated intake gas negative pressure obtained by the estimated intake gas negative pressure calculation unit, the engine control unit prohibits a fuel supply to the engine until the actual intake gas negative pressure matches the estimated intake gas negative pressure, and carries out the fuel supply to the engine when the actual intake gas negative pressure matches the estimated intake gas negative pressure.

2. A control device for a hybrid vehicle according to claim 1, wherein an initial value of fuel injection amount smaller than a normal fuel injection amount is set when the fuel supply is restarted, and an amount of the fuel supply is gradually increased until the fuel injection amount reaches the normal fuel injection amount.

3. A control device for a hybrid vehicle according to claim 1, wherein a predetermined amount ignition retard is carried out when returned to the all cylinder operation state from the cylinder deactivated operation state, and an ignition timing is gradually returned to a normal ignition timing after restarting a fuel injectino.

4. A control device for a hybrid vehicle according to claim 2, wherein a predetermined amount ignition retard is carried out when returned to the all cylinder operation state from the cylinder deactivated operation state, and an ignition timing is gradually returned to a normal ignition timing after restarting a fuel injectino.

5. A control device for a hybrid vehicle according to claim 1, wherein a driving force is assisted by the motor during a time period between fuel supply prohibition and a restart of fuel supply when returning to the all cylinder operation state from the cylinder deactivated operation state.

6. A control device for a hybrid vehicle according to claim 2, wherein a driving force is assisted by the motor during a time period between fuel supply prohibition and a restart of fuel supply when returning to the all cylinder operation state from the cylinder deactivated operation state.

7. A control device for a hybrid vehicle according to claim 3, wherein a driving force is assisted by the motor during a time period between fuel supply prohibition and a restart of fuel supply when returning to the all cylinder operation state from the cylinder deactivated operation state.

8. A control device for a hybrid vehicle according to claim 4, wherein a driving force is assisted by the motor during a time period between fuel supply prohibition and a restart of fuel supply when returning to the all cylinder operation state from the cylinder deactivated operation state.

9. A control device for a hybrid vehicle provided with an engine including a plurality of cylinders and a motor as driving sources, in the vehicle a supply of fuel to the engine during a deceleration state of the vehicle is stopped and a regeneration control is performed by the motor in accordance with the state of deceleration, and the engine is a cylinder deactivatable engine capable of switching to an all cylinder operation state from a cylinder deactivated operation state in which at least one of the cylinders is deactivated, and vice versa, so that a cylinder deactivated operation of the engine is carried out in accordance with an operation state of the vehicle during deceleration, the control device comprising:

an actual intake gas negative pressure detection unit which detects an intake air negative pressure for the engine;

an estimated intake gas negative pressure calculation unit which estimates an intake air negative pressure based on a revolution number of the engine and an opening degree of a throttle, both the actual intake gas negative pressure detection unit and the estimated intake gas negative pressure calculation unit being used when the operation state of the engine is switched to the all cylinder operation state from the cylinder deactivated operation state, and a supply of fuel to the engine is about to be restarted by a fuel supply amount control unit; and, an engine control unit which compares an actual intake gas negative pressure obtained by the actual intake gas negative pressure detection unit with an estimated intake gas negative pressure obtained by the estimated intake gas negative pressure calculation unit, the engine control unit determines a fuel supply amount based on the actual intake gas negative pressure when the actual intake gas negative pressure is larger than the estimated intake gas negative pressure, and determines the fuel supply amount based on the estimated intake gas negative pressure when the estimated intake gas negative pressure is larger than the actual intake gas negative pressure, and carries out the fuel supply.

10. A control device for a hybrid vehicle according to claim 9, wherein a fuel injection amount based on the actual intake gas negative pressure is determined after returning to the all cylinder operation state from the cylinder deactivated operation state and a predetermined period of time has been elapsed.

11. A control device for a hybrid vehicle according to claim 9, further comprising:

an ignition timing control unit which controls an ignition timing, wherein the ignition timing control unit carries out an ignition timing control based on the actual intake gas negative pressure and the estimated intake gas negative pressure.

12. A control device for a hybrid vehicle provided with an engine including a plurality of cylinders and a motor as driving sources, in the vehicle a supply of fuel to the engine during a deceleration state of the vehicle is stopped and a regeneration control is performed by the motor in accordance with the state of deceleration, and the engine is a cylinder deactivatable engine capable of switching to an all cylinder operation state from a cylinder deactivated operation state in which at least one of the cylinders is deactivated, and vice versa, so that a cylinder deactivated operation of the engine is carried out in accordance with an operation state of the vehicle during deceleration, the control device comprising:

a basic fuel injection amount calculation unit which calculates a basic fuel injection amount based on an intake air negative pressure for the engine and a revolution number of the engine;

a fuel injection amount calculation unit which calculates a fuel injection amount based on the revolution number of the engine and an opening degree of a throttle, both the basic fuel injection amount calculation unit and the fuel injection amount calculation unit being used when the operation state of the engine is switched to the all cylinder operation state from the cylinder deactivated operation state, and a supply of fuel to the engine is about to be restarted by a fuel supply amount control unit; and, an engine control unit which compares a fuel injection amount calculated by the fuel injection amount calculation unit with a basic fuel injection amount calculated by the basic fuel injection amount calculation unit, and carries out a fuel supply based on a comparison result obtained.

\* \* \* \* \*